United States Patent
Leeland et al.

(10) Patent No.: US 12,351,681 B2
(45) Date of Patent: Jul. 8, 2025

(54) POLYOL BLOCK COPOLYMER, COMPOSITIONS AND PROCESSES THEREFOR

(71) Applicant: ECONIC TECHNOLOGIES LTD, Macclesfield (GB)

(72) Inventors: James Leeland, Macclesfield (GB); Rakibul Kabir, Macclesfield (GB); Kerry Riley, Macclesfield (GB); Michael Kember, Macclesfield (GB)

(73) Assignee: Econic Technologies, Ltd., Macclesfield (GB)

( * ) Notice: Subject to any disclaimer, the term of this patent is extended or adjusted under 35 U.S.C. 154(b) by 684 days.

(21) Appl. No.: 17/608,249

(22) PCT Filed: May 1, 2020

(86) PCT No.: PCT/GB2020/051082
§ 371 (c)(1),
(2) Date: Nov. 2, 2021

(87) PCT Pub. No.: WO2020/222018
PCT Pub. Date: Nov. 5, 2020

(65) Prior Publication Data
US 2022/0227925 A1    Jul. 21, 2022

(30) Foreign Application Priority Data
May 2, 2019   (GB) .................... 1906210

(51) Int. Cl.
*C08G 64/18*   (2006.01)
*C08G 18/10*   (2006.01)
(Continued)

(52) U.S. Cl.
CPC ............ *C08G 64/183* (2013.01); *C08G 18/44* (2013.01); *C08G 64/34* (2013.01);
(Continued)

(58) Field of Classification Search
CPC ........ C08G 64/183; C08G 18/44; C08G 64/34
See application file for complete search history.

(56) References Cited

U.S. PATENT DOCUMENTS 3,427,256 A   2/1969   Milgrom
4,500,704 A   2/1985   Kruper, Jr. et al.
(Continued)

FOREIGN PATENT DOCUMENTS

CN   101412809 A   4/2009
CN   106471042 A   3/2017
(Continued)

OTHER PUBLICATIONS

Unity of Invention Requirement issued for U.S. Appl. No. 17/608,251, filed Jun. 10, 2024 (7 pages).
(Continued)

*Primary Examiner* — David J Buttner
*Assistant Examiner* — Surbhi M Du
(74) *Attorney, Agent, or Firm* — Shumaker, Loop & Kendrick, LLP

(57) ABSTRACT

A polyol block copolymer comprising a polycarbonate block, A (-A'-Z'—Z—(Z'-A')$_n$-), and polyethercarbonate blocks, B. The polyol block copolymer has the polyblock structure:

B-A'-Z'—Z—(Z'-A'-B)$_n$ wherein n=t−1 and wherein t=the number of terminal OH group residues on the block A; and wherein each A' is independently a polycarbonate chain having at least 70% carbonate linkages, and wherein each B is independently a polyethercarbonate chain having 50-99% ether linkages and at least 1% carbonate linkages; and wherein Z'—Z—(Z')$_n$ is a starter residue. A process of producing a polyol block
(Continued)

copolymer from a two step process carried out in two reactors, and products and compositions incorporating such copolymers.

22 Claims, 1 Drawing Sheet

(51) Int. Cl.
  *C08G 18/44* (2006.01)
  *C08G 18/70* (2006.01)
  *C08G 64/02* (2006.01)
  *C08G 64/34* (2006.01)
  *C08G 65/26* (2006.01)

(52) U.S. Cl.
  CPC ..... *C08G 65/2603* (2013.01); *C08G 65/2606* (2013.01); *C08G 65/2663* (2013.01); C08G 18/10 (2013.01); C08G 18/70 (2013.01); C08G 64/0208 (2013.01); C08G 2650/36 (2013.01)

(56) References Cited

U.S. PATENT DOCUMENTS

| | | | |
|---|---|---|---|
| 4,826,953 | A | 5/1989 | Kuyper et al. |
| 4,866,143 | A | 9/1989 | Gagnon et al. |
| 5,158,922 | A | 10/1992 | Hinney et al. |
| 5,482,908 | A | 1/1996 | Le-Khac |
| 5,536,883 | A | 7/1996 | Le-Khac |
| 5,693,584 | A | 12/1997 | Le-Khac |
| 5,780,584 | A | 7/1998 | Le-Khac et al. |
| 5,783,513 | A | 7/1998 | Combs et al. |
| 6,133,402 | A | 10/2000 | Coates et al. |
| 6,291,388 | B1 | 9/2001 | Hofmann et al. |
| 6,486,361 | B1 | 11/2002 | Ehlers et al. |
| 6,608,231 | B1 | 8/2003 | Ooms et al. |
| 6,699,961 | B2 | 3/2004 | Eleveld et al. |
| 6,716,788 | B2 | 4/2004 | Eleveld et al. |
| 6,835,687 | B2 | 12/2004 | Hofmann et al. |
| 6,977,236 | B2 | 12/2005 | Eleveld et al. |
| 7,008,900 | B1 | 3/2006 | Hofmann et al. |
| 7,034,103 | B2 | 4/2006 | Combs |
| 7,811,958 | B2 | 10/2010 | Bohres et al. |
| 7,968,754 | B2 | 6/2011 | Ostrowski et al. |
| 7,977,501 | B2 | 7/2011 | Haider et al. |
| 8,278,239 | B2 | 10/2012 | Coates et al. |
| 9,018,318 | B2 | 4/2015 | Deglmann et al. |
| 9,315,622 | B2 | 4/2016 | Hofmann et al. |
| 2003/0204042 | A1* | 10/2003 | Moethrath ........... C08G 64/305 528/196 |
| 2015/0259475 | A1 | 9/2015 | Muller et al. |
| 2017/0107245 | A1 | 4/2017 | Wu |
| 2017/0198092 | A1* | 7/2017 | Braun ................ C08G 65/2696 |

FOREIGN PATENT DOCUMENTS

| | | | | |
|---|---|---|---|---|
| CN | 107868239 | A | 4/2018 | |
| EP | 1359177 | A1 * | 11/2003 | ........... C08G 64/305 |
| EP | 1529566 | A1 | 5/2005 | |
| EP | 1568414 | A1 | 8/2005 | |
| EP | 2258745 | A1 | 12/2010 | |
| EP | 2730602 | A1 | 5/2014 | |
| EP | 2888309 | B1 | 8/2016 | |
| EP | 2239291 | B1 | 2/2019 | |
| JP | 2008081518 | A | 4/2008 | |
| JP | 2010-509479 | A | 3/2010 | |
| JP | 2014-515429 | A | 6/2014 | |
| WO | 2008058913 | A1 | 5/2008 | |
| WO | 2008136591 | A1 | 11/2008 | |
| WO | 2009130470 | A1 | 10/2009 | |
| WO | 2010022388 | A2 | 2/2010 | |
| WO | 2010028362 | A1 | 3/2010 | |
| WO | 2010062703 | A1 | 6/2010 | |
| WO | 2011105846 | A2 | 9/2011 | |
| WO | 2012037282 | A2 | 3/2012 | |
| WO | 2012163944 | A1 | 12/2012 | |
| WO | 2013012895 | A1 | 1/2013 | |
| WO | 20130334750 | A2 | 3/2013 | |
| WO | 2014148825 | A1 | 9/2014 | |
| WO | 2015022290 | A1 | 2/2015 | |
| WO | 2015059068 | A1 | 4/2015 | |
| WO | 2016012785 | A1 | 1/2016 | |
| WO | 2016012786 | A1 | 1/2016 | |
| WO | 2017037441 | A9 | 3/2017 | |
| WO | 2018089568 | A1 | 5/2018 | |
| WO | 2018/158389 | A1 | 9/2018 | |
| WO | 2018158370 | A1 | 9/2018 | |
| WO | 2019048878 | A1 | 3/2019 | |
| WO | 2019126221 | A1 | 6/2019 | |

OTHER PUBLICATIONS

Chinese Office Action (CNOA) issued for Chinese Patent Application No. 2020800477480, dated Mar. 22, 2023 (11 pages).
Combined Search & Exam Reported for GB1906210.8 dated Nov. 7, 2019 (4 pages).
International Search Report (ISR) for PCT/GB2020/051082 mailed Jul. 8, 2020 (3 pages).
Written Opinion for PCT/GB2020/051082 mailed Jul. 8, 2020 (7 pages).
International Search Report (ISR) for PCT/GB2020/051083 mailed Jul. 8, 2020 (4 pages).
Written Opinion for PCT/GB2020/051083 mailed Jul. 8, 2020 (6 pages).
Final Rejection issued for U.S. Appl. No. 17/608,251, filed Dec. 10, 2024 (13 pages).
Non-Final Office Action issued for U.S. Appl. No. 17/608,251, filed Sep. 17, 2024 (12 pages).
Japanese Office Action (JPOA) issued for Japanese Patent Application No. JP 2021-564877 dated Jun. 4, 2024 (10 pages).

* cited by examiner

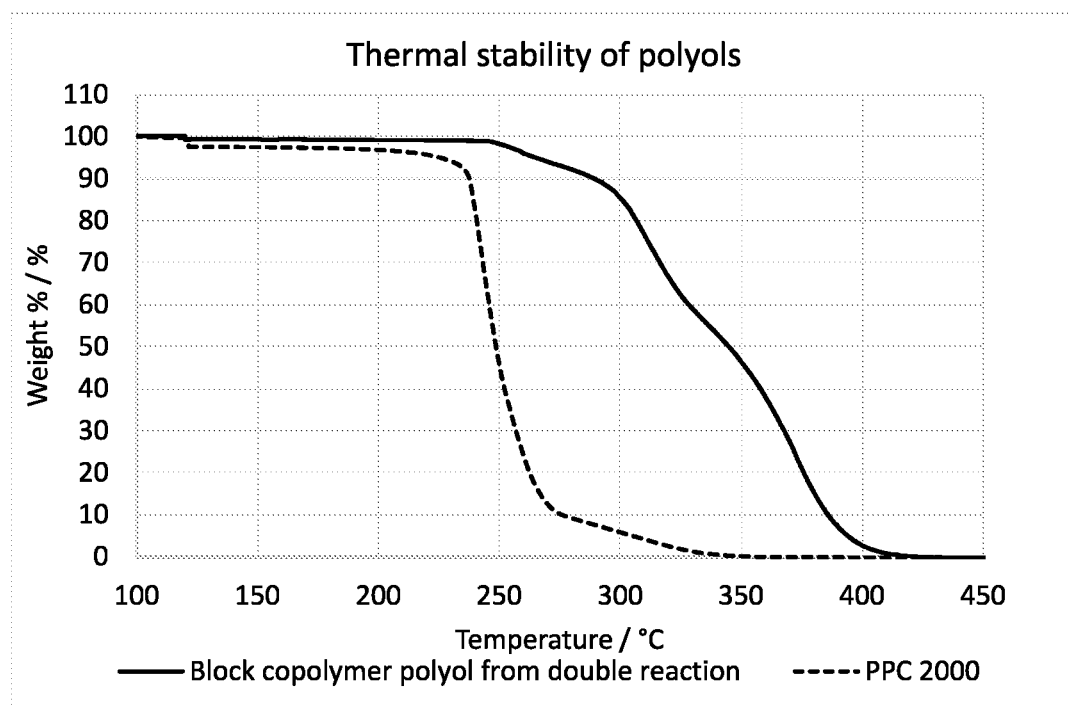

POLYOL BLOCK COPOLYMER, COMPOSITIONS AND PROCESSES THEREFOR

TECHNICAL FIELD

The present invention relates to polyol block copolymers comprising polycarbonate and polyether carbonate blocks, the process of producing a polyol block copolymer from a two step process carried out in two separate reactors, and products and compositions incorporating such copolymers.

BACKGROUND

WO2015059068 and US2015/0259475 from Covestro disclose the use of a DMC catalyst for the production of polyether carbonate polyols from $CO_2$ and alkylene oxide in the presence of a starter compound. Many H-functional starter compounds are listed including polyether carbonate polyols, polycarbonate polyols and polycarbonates.

However, a DMC catalyst alone is limited in the amount of carbon dioxide it can incorporate into a polyethercarbonate polyol, requiring high pressures (generally more than 40 bar) to achieve a maximum of around 50% of the possible $CO_2$ incorporation. Furthermore, a DMC catalyst requires a pre-activation step, usually in the absence of $CO_2$, which initially produces a polyether. $CO_2$ is then added and incorporated into the polymer structure. This means that a DMC catalyst alone cannot produce low molecular weight polyols (e.g. <1000 Mn) with substantial $CO_2$ content and the $CO_2$ content of the polyol is even restricted at higher weights such as 2000 Mn. Polyethercarbonate polyols produced by a DMC alone generally have a structure which is rich in ether linkages in the centre of the polymer chain and richer in carbonate groups towards the hydroxyl terminal groups. This is not advantageous as the ether groups are substantially more stable to heat and basic conditions than the carbonate linkages.

WO2010062703 discloses production of block copolymers having a polycarbonate block and a hydrophilic block (e.g. a polyether). A two pot production is described, using a carbonate catalyst in the first reaction to produce an alternating polycarbonate block, followed by quenching of the reaction, isolation of the polyol from solvents and unreacted monomers and then a second batch reaction with a DMC catalyst (in the absence of $CO_2$) to incorporate the hydrophilic oligomer, such as poly(alkylene oxide). The process can be used to produce B-A-B polymers where A is a polycarbonate and B is a hydrophilic block such as a polyether. The polymers have use in enhanced oil recovery.

The invention allows production of polycarbonate block polyethercarbonate polyols containing significantly increased $CO_2$ content under mild pressures by using low molecular weight $CO_2$ containing polycarbonate polyols (produced by a carbonate catalyst in a first reaction) as starters for a reaction between DMC catalyst, epoxide and $CO_2$. Unlike the polyether carbonate polyols produced by a DMC catalyst alone, the polycarbonate block polyethercarbonate polyols produced by the invention can produce low molecular weight polyols (e.g. <1000 Mn) with substantial $CO_2$ content (e.g. >7 wt %). Advantageously, the low molecular weight polycarbonate polyols do not have to be isolated but can be made in one reactor and transferred directly into the second without removing any catalyst, unreacted monomer or solvents.

WO2017037441 describes a process where a carbonate catalyst and a DMC catalyst are used in one reactor to produce a polyethercarbonate polyol. The conditions of the reaction must be balanced to meet the needs of two different catalysts. Advantageously, the invention allows optimisation of the conditions for use of two different types of catalyst, a carbonate catalyst and a DMC catalyst, enabling optimisation of conditions for each catalyst individually rather than compromising to suit the overall system. The high carbonate content polyol can also be added directly to a pre-activated DMC catalyst, which is more desirable as it reduces cycle times and increases process safety by limiting unreacted monomer content in the reactor.

Furthermore, the invention can be used to produce unique polycarbonate polyethercarbonate polyol block copolymers which contain a core of high carbonate content chains with a terminal block of high ether content polyether carbonate chains. Polyurethanes made from such polyols benefit from the advantages of high carbonate linkages (e.g. increased strength, increased chemical resistance, resistance to both hydrolysis and oil etc) whilst still retaining the higher thermal stability that high ether content end blocks provide. The polyols can advantageously be made using the same or similar epoxide reactants and $CO_2$ in both reactions.

BRIEF DESCRIPTION OF THE FIGURES

These and other features, aspects and advantages of the present invention are better understood when the following detailed description of the invention is read with reference to the accompanying drawings, in which;

FIG. 1 depicts thermal stability of block copolymer polyols produced by double reaction vs. alternating polycarbonate polyols produced by CO/epoxide copolymerisation

DETAILED DESCRIPTION

According to the first aspect of the invention, there is provided a polyol block copolymer comprising a polycarbonate block, A 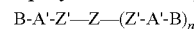, and polyethercarbonate blocks, B, wherein the polyol block copolymer has the polyblock structure:

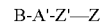

wherein n=t−1 and wherein t=the number of terminal OH group residues on the block A; and wherein each A' is independently a polycarbonate chain having at least 70% carbonate linkages, and wherein each B is independently a polyethercarbonate chain having 50-99% ether linkages and at least 1% carbonate linkages and wherein Z'—Z—(Z'), is a starter residue. The polyol may be essentially a tapered or gradient polyol, where the first block has a higher carbonate content than the second block and the second block a lower carbonate content than the first block.

For the avoidance of doubt, when t=1 then n=0 and the polyblock structure is:

B-A'-Z'—Z

The polycarbonate block comprises -A'- which may have the following structure:

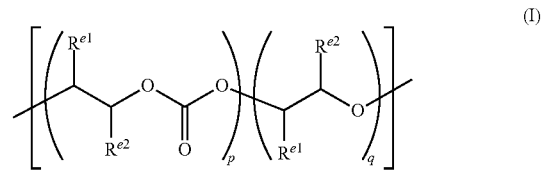

(I)

wherein the ratio of p:q is at least 7:3; and
$R^{e1}$ and $R^{e2}$ depend on the nature of the epoxide used to prepare blocks A.

The polyethercarbonate block B may have the following structure:

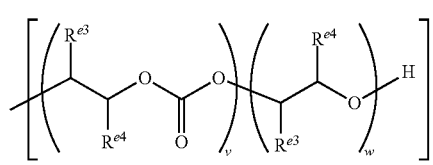

(II)

wherein the ratio of w:v is greater or equal to 1:1; and $R^{e3}$ and $R^{e4}$ depend on the nature of the epoxide used to prepare blocks B.

Each $R^{e1}$, $R^{e2}$, $R^{e3}$, or $R^{e4}$ may be independently selected from H, halogen, hydroxyl, or optionally substituted alkyl, alkenyl, alkynyl, cycloalkyl, heterocycloalkyl, aryl, heteroaryl, heteroalkyl or heteroalkenyl, preferably selected from H or optionally substituted alkyl.

$R^{e1}$ and $R^{e2}$ or $R^{e3}$ and $R^{e4}$ may together form a saturated, partially unsaturated or unsaturated ring containing carbon and hydrogen atoms, and optionally one or more heteroatoms.

As set out above, the nature of $R^{e1}$, $R^{e2}$, $R^{e3}$ and $R^{e4}$ will depend on the epoxide used in the reaction. For example, if the epoxide is cyclohexene oxide (CHO), then $R^{e1}$ and $R^{e2}$ (or $R^{e3}$ and $R^{e4}$) will together form a six membered alkyl ring (e.g. a cyclohexyl ring). If the epoxide is ethylene oxide, then $R^{e1}$ and $R^{e2}$ (or $R^{e3}$ and $R^{e4}$) will be H. If the epoxide is propylene oxide, then $R^{e1}$ (or $R^{e3}$) will be H and $R^{e2}$ (or $R^{4}$) will be methyl (or $R^{e1}$ (or $R^{e3}$) will be methyl and $R^{e2}$ (or $R^{e4}$) will be H, depending on how the epoxide is added into the polymer backbone). If the epoxide is butylene oxide, then $R^{e1}$ (or $R^{e3}$) will be H and $R^{e2}$ (or $R^{4}$) will be ethyl (or vice versa). If the epoxide is styrene oxide, then $R^{e1}$ (or $R^{e3}$) may be hydrogen, and $R^{e2}$ (or $R^{e4}$) may be phenyl (or vice versa). If the epoxide is a glycidyl ether, then $R^{e1}$ (or $R^{e3}$) will be an ether group ($-CH_2-OR_{20}$) and $R^{e2}$ (or $R^{e4}$) will be H (or vice versa). If the epoxide is a glycidyl ester, then $R^{e1}$ (or $R^{e3}$) will be an ester group ($-CH_2-OC(O)R_{12}$) and $R^{e2}$ (or $R^{4}$) will be H (or vice versa). If the epoxide is a glycidyl carbonate, then $R^{e1}$ (or $R^{e3}$) will be a carbonate group ($CH_2-OC(O)OR_{18}$) and $R^{e2}$ (or $R^{4}$) will be H (or vice versa).

It will also be appreciated that if a mixture of epoxides are used, then each occurrence of $R^{e1}$ and/or $R^{e2}$ (or $R^{e3}$ and/or $R^{e4}$) may not be the same, for example if a mixture of ethylene oxide and propylene oxide are used, $R^{e1}$ (or $R^{e3}$) may be independently hydrogen or methyl, and $R^{e2}$ (or $R^{e4}$) may be independently hydrogen or methyl.

Thus, $R^{e1}$ and $R^{e2}$ (or $R^{e3}$ and $R^{e4}$) may be independently selected from hydrogen, alkyl or aryl, or $R^{e1}$ and $R^{e2}$ (or $R^{e3}$ and $R^{e4}$) may together form a cyclohexyl ring, preferably $R^{e1}$ and $R^{e2}$ (or $R^{e3}$ and $R^{e4}$) may be independently selected from hydrogen, methyl, ethyl or phenyl, or $R^{e1}$ and $R^{e2}$ (or $R^{e3}$ and $R^{e4}$) may together form a cyclohexyl ring.

The identity of Z and Z' will depend on the nature of the starter compound.

The starter compound may be of the formula (III):

(III)

Z can be any group which can have 1 or more $-R^{Z}$ groups attached to it, preferably 2 or more $-R^{z}$ groups attached to it. Thus, Z may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups, for example Z may be an alkylarylene, heteroalkylarylene, heteroalkylheteroarylene or alkylheteroarylene group. Optionally Z is alkylene, heteroalkylene, arylene, or heteroarylene.

It will be appreciated that a is an integer which is at least 1, preferably at least 2. Optionally a is in the range of between 1 and 8, optionally a is in the range of between 2 and 6.

Each $R^{Z}$ may be $-OH$, $-NHR'$, $-SH$, $-C(O)OH$, $-P(O)(OR')(OH)$, $-PR'(O)(OH)_2$ or $-PR'(O)OH$, optionally $R^{Z}$ is selected from $-OH$, $-NHR'$ or $-C(O)OH$, optionally each $R^{z}$ is $-OH$, $-C(O)OH$ or a combination thereof (e.g. each $R^{z}$ is $-OH$).

R' may be H, or optionally substituted alkyl, heteroalkyl, aryl, heteroaryl, cycloalkyl or heterocycloalkyl, optionally R' is H or optionally substituted alkyl.

Z' corresponds to $R^{z}$, except that a bond replaces the labile hydrogen atom. Therefore, the identity of each Z' depends on the definition of $R^{Z}$ in the starter compound. Thus, it will be appreciated that each Z' may be $-O-$, $-NR'-$, $-S-$, $-C(O)O-$, $-P(O)(OR')O-$, $-PR'(O)(O-)_2$ or $-PR'(O)O-$ (wherein R' may be H, or optionally substituted alkyl, heteroalkyl, aryl, heteroaryl, cycloalkyl or heterocycloalkyl, preferably R' is H or optionally substituted alkyl), preferably Z' may be $-C(O)O-$, $-NR'-$ or $-O-$, more preferably each Z' may be $-O-$, $-C(O)O-$ or a combination thereof, more preferably each Z' may be $-O-$.

Preferably, the polyol block copolymer has a molecular weight (Mn) in the range of from about 300 to 20,000 Da, more preferably in the range of from about 400 to 8000 Da, most preferably from about 500-6000 Da.

The polycarbonate block, A, of the polyol block copolymer preferably has a molecular weight (Mn) in the range of from about 200 to 4000 Da, more preferably in the range of from about 200 to 2000 Da, most preferably from about 200 to 1000 Da, especially from about 400 to 800 Da.

The polyethercarbonate blocks, B, of the polyol block copolymer preferably have a molecular weight (Mn) in the range of from about 100 to 20,000 Da, more preferably of from about 200 to 10,000 Da, most preferably from about 200 to 5000 Da.

Alternatively, the polyethercarbonate blocks B and hence also the polyol block copolymer may have a high molecular weight. The polyethercarbonate blocks B may have a molecular weight of at least about 25,000 Daltons, such as at least about 40,000 Daltons, e.g. at least about 50,000 Daltons, or at least about 100,000 Daltons. High molecular weight polyol block copolymers formed by the method of the present invention may have molecular weights above about 100,000 Daltons.

The Mn and hence the PDI of the polymers produced by the processes of the invention may be measured using Gel Permeation Chromatography (GPC). For example, the GPC may be measured using an Agilent 1260 Infinity GPC machine with two Agilent PLgel μ-m mixed-D columns in series. The samples may be measured at room temperature (293K) in THE with a flow rate of 1 mL/min against narrow polystyrene standards (e.g. polystyrene low EasiVials supplied by Agilent Technologies with a range of Mn from 405 to 49,450 g/mol). Optionally, the samples may be measured against poly(ethylene glycol) standards, such as polyethylene glycol easivials supplied by Agilent Technologies.

The polycarbonate block, A, of the polyol clock copolymer may have at least 76% carbonate linkages, preferably at least 80% carbonate linkages, more preferably at least 85% carbonate linkages. Block A may have less than 98% carbonate linkages, preferably less than 97% carbonate linkages, more preferably less than 95% carbonate linkages. Optionally, block A has between 75% and 99% carbonate linkages, preferably between 77% and 95% carbonate linkages, more preferably between 80% and 90% carbonate linkages.

The polyethercarbonate blocks, B, of the polyol block copolymer may have less than 40% carbonate linkages, preferably less than 35% carbonate linkages, more preferably less than 30% carbonate linkages. Block B may have at least 5% carbonate linkages, preferably at least 10% carbonate linkages, more preferably at least 15% carbonate linkages. Optionally, block B may have between 1% and 50% carbonate linkages, preferably between 5% and 45% carbonate linkages, more preferably between 10% and 40% carbonate linkages.

The polyethercarbonate blocks, B, of the polyol block copolymer may have at least 60% ether linkages, preferably at least 65% ether linkages, more preferably at least 70% ether linkages. The polyethercarbonate blocks, B, of the polyol block copolymer may have less than 95% ether linkages, preferably less than 90% ether linkages, more preferably less than 85% ether linkages. Optionally, block B may have between 50% and 99% ether linkages, preferably between 55% and 95% ether linkages, more preferably between 60% and 90% ether linkages.

The polycarbonate block, A, of the polyol block copolymer may also comprise ether linkages. Block A may have less than 24% ether linkages, preferably less than 20% ether linkages, more preferably less than 15% ether linkages. Block A may have at least 1% ether linkages, preferably at least 3% ether linkages, more preferably at least 5% ether linkages. Optionally, block A may have between 1% and 25% ether linkages, preferably between 5% and 20% ether linkages, more preferably between 10% and 15% ether linkages.

Optionally, block A may be a generally alternating polycarbonate polyol residue. If the epoxide is asymmetric, then the polycarbonate may have between 0-100% head to tail linkages, preferably between 40-100% head to tail linkages, more preferably between 50-100%. The polycarbonate may have a statistical distribution of head to head, tail to tail and head to tail linkages in the order 1:2:1, indicating a non-stereoselective ring opening of the epoxide, or it may preferentially make head to tail linkages in the order of more than 50%, optionally more than 60%, more than 70%, more than 80%, or more than 90%.

Typically, the mol/mol ratio of block A to block B is in the range 25:1 to 1:250. Typically the weight ratio of block A to block B is in the range 50:1 to 1:100.

Typically, block A, the polycarbonate block, is derived from epoxide and $CO_2$, more typically, epoxide and $CO_2$ provide at least 90% of the residues in the block, especially, at least 95% of the residues in the block, more especially, at least 99% of the residues in the block, most especially, about 100% of the residues in the block are residues of epoxide and $CO_2$. Most typically, block A includes ethylene oxide and/or propylene oxide residues and optionally other epoxide residues such as cyclohexylene oxide, butylene oxide, glycidyl ethers, glycidyl esters and glycidyl carbonates. At least 30% of the epoxide residues of block A may be ethylene oxide or propylene oxide residues, typically, at least 50% of the epoxide residues of block A are ethylene oxide or propylene oxide residues, more typically, at least 75% of the epoxide residues of block A are ethylene oxide or propylene oxide residues, most typically, at least 90% of the epoxide residues of block A are ethylene oxide or propylene oxide residues.

Typically, the carbonate of block A is derived from $CO_2$ i.e. the carbonates incorporate $CO_2$ residues. Typically, block A has between 70-100% carbonate linkages, more typically, 80-100%, most typically, 90-100%.

Typically, block B, the polyethercarbonate block, is derived from epoxides and $CO_2$. Typically, epoxide and $CO_2$ provide at least 90% of the residues in the block, especially, at least 95% of the residues in the block, more especially, at least 99% of the residues in the block, most especially, about 100% of the residues in the block are residues of epoxide and $CO_2$. Most typically, block B includes ethylene oxide and/or propylene oxide residues and optionally other epoxide residues such as cyclohexylene oxide, butylene oxide, glycidyl ethers, glycidyl esters and glycidyl carbonates. At least 30% of the epoxide residues of block B may be ethylene oxide or propylene oxide residues, typically, at least 50% of the epoxide residues of block B are ethylene oxide or propylene oxide residues, more typically, at least 75% of the epoxide residues of block B are ethylene oxide or propylene oxide residues, most typically, at least 90% of the epoxide residues of block B are ethylene oxide or propylene oxide residues.

Optionally, block B incorporates $CO_2$ residues in the carbonate groups.

According to the second aspect of the invention, there is also provided a composition comprising the polyol block copolymer according to the first aspect of the present invention. The composition may also comprise of one or more additives from those known in the art. The additives may include, but are not limited to, catalysts, blowing agents, stabilizers, plasticisers, fillers, flame retardants, defoamers, and antioxidants.

Fillers may be selected from mineral fillers or polymer fillers, for example, styrene-acrylonitrile (SAN) dispersion fillers.

The blowing agents may be selected from chemical blowing agents or physical blowing agents. Chemical blowing agents typically react with (poly)isocyanates and liberate volatile compounds such as $CO_2$. Physical blowing agents typically vaporize during the formation of the foam due to their low boiling points. Suitable blowing agents will be known to those skilled in the art, and the amounts of blowing agent added can be a matter of routine experimentation. One or more physical blowing agents may be used or one or more chemical blowing agents may be used, in addition one or more physical blowing agents may be used in conjunction with one or more chemical blowing agents.

Chemical blowing agents include water and formic acid. Both react with a portion of the (poly)isocyanate producing carbon dioxide which can function as the blowing agent. Alternatively, carbon dioxide may be used directly as a blowing agent, this has the advantage of avoiding side reactions and lowering urea crosslink formation, if desired water may be used in conjunction with other blowing agents or on its own.

Typically, physical blowing agents for use in the current invention may be selected from acetone, carbon dioxide, optionally substituted hydrocarbons, and chloro/fluorocarbons. Chloro/fluorocarbons include hydrochlorofluorocarbons, chlorofluorocarbons, fluorocarbons and chlorocarbons. Fluorocarbon blowing agents are typically selected from the group consisting of: difluoromethane, trifluoromethane, fluoroethane, 1,1-difluoroethane, 1,1,1-trifluoroethane, tetrafluoroethanes difluorochloroethane, dichloromono-fluoromethane, 1,1-dichloro-1-fluoroethane, 1,1-difluoro-1,2,2-trichloroethane, chloropentafluoroethane, tetrafluoropropanes, pentafluoropropanes, hexafluoropropanes, heptafluoropropanes, pentafluorobutanes.

Olefin blowing agents may be incorporated, namely trans-1-chloro-3,3,3-trifluoropropene (LBA), trans-1,3,3,3-tetrafluoro-prop-1-ene (HFO-1234ze), 2,3,3,3-tetrafluoro-propene (HFO-1234yf), cis-1,1,1,4,4,4-hexafluoro-2-butene (HFO-1336mzz). Typically, non-halogenated hydrocarbons for use as physical blowing agents may be selected from butane, isobutane, 2,3-dimethylbutane, n- and i-pentane isomers, hexane isomers, heptane isomers and cycloalkanes including cyclopentane, cyclohexane and cycloheptane. More typically, non-halogenated hydrocarbons for use as physical blowing agents may be selected from cyclopentane, iso-pentane and n-pentane.

Typically, where one or more blowing agents are present, they are used in an amount of from about 0 to about 10 parts, more typically 2-6 parts of the total formulation. Where water is used in conjunction with another blowing agent the ratio of the two blowing agents can vary widely, e.g. from 1 to 99 parts by weight of water in total blowing agent, preferably, 25 to 99+ parts by weight water Preferably, the blowing agent is selected from cyclopentane, iso-pentane, n-pentane. More preferably the blowing agent is n-pentane.

Typical plasticisers may be selected from succinate esters, adipate esters, phthalate esters, diisooctylphthalate (DIOP), benzoate esters and N,N-bis(2-hydroxyethyl)-2-aminoethane sulfonic acid (BES).

Typical flame retardants will be known to those skilled in the art, and may be selected from phosphonamidates, 9,10-dihydro-9-oxa-phosphaphenanthrene-10-oxide (DOPO), chlorinated phosphate esters, Tris(2-chloroisopropyl)phosphate (TCPP), Triethyl phosphate (TEP), tris(chloroethyl) phosphate, tris(2,3-dibromopropyl) phosphate, 2,2-bis(chloromethyl)-1,3-propylene bis(di(2-chloroethyl) phosphate), tris(1,3-dichloropropyl) phosphate, tetrakis(2-chloroethyl) ethylene diphosphate, tricresyl phosphate, cresyl diphenyl phosphate, diammonium phosphate, melamine, melamine pyrophosphate, urea phosphate, alumina, boric acid, various halogenated compounds, antimony oxide, chlorendic acid derivatives, phosphorus containing polyols, bromine containing polyols, nitrogen containing polyols, and chlorinated paraffins. Flame retardants may be present in amounts from 0-60 parts of the total mixture.

The compositions of the invention can further comprise a (poly)isocyanate.

Typically, the (poly)isocyanate comprises two or more isocyanate groups per molecule. Preferably, the (poly)isocyanates are diisocyanates. However, the (poly)isocyanates may be higher (poly)isocyanates such as triisocyanates, tetraisocyanates, isocyanate polymers or oligomers, and the like. The (poly)isocyanates may be aliphatic (poly)isocyanates or derivatives or oligomers of aliphatic (poly)isocyanates or may be aromatic (poly)isocyanates or derivatives or oligomers of aromatic (poly)isocyanates. Typically, the (poly)isocyanate component has a functionality of 2 or more. In some embodiments, the (poly)isocyanate component comprises a mixture of diisocyanates and higher isocyanates formulated to achieve a particular functionality number for a given application.

In some embodiments, the (poly)isocyanate employed has a functionality greater than 2. In some embodiments, such (poly)isocyanates have a functionality between 2 to 5, more typically, 2-4, most typically, 2-3.

Suitable (poly)isocyanates which may be used include aromatic, aliphatic and cycloaliphatic polyisocyanates and combinations thereof. Such polyisocyanates may be selected from the group consisting of: 1,3-Bis(isocyanatomethyl) benzene, 1,3-Bis(isocyanatomethyl)cyclohexane (H6-XDI), 1,4-cyclohexyl diisocyanate, 1,2-cyclohexyl diisocyanate, 1,4-phenylene diisocyanate, 1,3-phenylene diisocyanate, 1,4-tetramethylene diisocyanate, 1,6-hexamethylene diisocyanate, 1,6-hexamethylaminediisocyanate (HDI), isophorone diisocyanate (IPDI), 2,4-toluene diisocyanate (TDI), 2,4,4-trimethylhexamethylene diisocyanate (TMDI), 2,6-toluene diisocyanate (TDI), 4,4' methylene-bis(cyclohexyl isocyanate) (H12MDI), naphthalene-1,5-diisocyanate, diphenylmethane-2,4'-diisocyanate (MDI), diphenylmethane-4,4'-diisocyanate (MDI), triphenylmethane-4,4',4"triisocyanate, isocyanatomethyl-1,8-octane diisocyanate (TIN), m-tetramethylxylylene diisocyanate (TMXDI), p-tetramethylxylylene diisocyanate (TMXDI), Tris(p-isocyanatomethyl)thiosulfate, trimethylhexane diisocyanate, lysine diisocyanate, m-xylylene diisocyanate (XDI), p-xylylene diisocyanate (XDI), 1,3,5-hexamethyl mesitylene triisocyanate, 1-methoxyphenyl-2,4-diisocyanate, toluene-2,4,6-triisocyanate, 4,4'-biphenylene diisocyanate, 3,3'-dimethyl-4,4'-diphenyl diisocyanate, 4,4'-dimethyldiphenyl methane-2,2',5,5'-tetraisocyanate and mixtures of any two or more of these. In addition, the (poly)isocyanates may be selected from polymeric version of any of these isocyanates, these may have high or low functionality. Preferred polymeric isocyanates may be selected from MDI, TDI, and polymeric MDI.

According to the third aspect of the invention, there is also provided a polyurethane produced from the reaction of a polyol block copolymer of the first aspect of the present invention and a (poly)isocyanate. A polyurethane can also be produced from the reaction of a composition according to the second aspect of the present invention and a (poly)isocyanate. The polyurethane may be in the form of a soft foam, a flexible foam, an integral skin foam, a high resilience foam, a viscoelastic or memory foam, a semi-rigid foam, a rigid foam (such as a polyurethane (PUR) foam, a polyisocyanurate (PIR) foam and/or a spray foam), an elastomer (such as a cast elastomer, a thermoplastic elastomer (TPU) or a microcellular elastomer), an adhesive (such as a hot melt adhesive, pressure sensitive or a reactive adhesive), a sealant or a coating (such as a waterborne or solvent dispersion (PUD), a two-component coating, a one component coating, a solvent free coating). The polyurethane may be formed via a process that involves extruding, moulding, injection moulding, spraying, foaming, casting and/or curing. The polyurethane may be formed via a 'one pot' or 'pre-polymer' process.

According to the fourth aspect of the present invention, there is also provided a polyurethane comprising a block copolymer residue having a polycarbonate block, A (-A'-Z'—Z—(Z'-A')$_n$-), wherein A' is a polycarbonate chain having at least 70% carbonate linkages and polyethercarbonate blocks, B, each having up to 50% carbonate linkages and at least 50% ether linkages, wherein the residue has a poly-block structure B-A'-Z'—Z—(Z'-A'-B)$_n$, wherein n=t−1 and wherein t=the number of terminal OH group residues on the block A and wherein Z'—Z—(Z')$_n$ is a starter residue.

The block copolymer residue of the polyurethane of the fourth aspect may include any one or more features as defined in relation to the first aspect of the invention.

The polyurethane of the third or fourth aspects may also comprise one or more chain extenders, which are typically low molecular polyols, polyamines or compounds with both amine and hydroxyl functionality known in the art. Such chain extenders include ethylene glycol, 1,2-propylene glycol, 1,3-propanediol, 1,4-butanediol, 1,5-pentanediol, 1,6-hexanediol, 1,8-octanediol, 1,10-decanediol, 1,12-dodecanediol, neopentyl glycol, trimethoxypropane (TMP), diethylene glycol, dipropylene glycol, diamines such as ethylenediamine, 1,2-propylenediamine, 1,3-propylenediamine, N-methylpropylene-1,3-diamine, 2,4-tolylenediamine, 2,6 tolylenediamine and diethanolamine.

According to the fifth aspect of the invention, there is also provided an isocyanate terminated polyurethane prepolymer comprising the reaction product of the polyol block copolymer according to the first aspect of the present invention or the composition of the second aspect of the present invention and an excess of (poly)isocyanate such as at least >1 mole of isocyanate groups per mole OH groups. The isocyanate terminated prepolymer may be formed into a polyurethane via reaction with one or more chain extenders (such as diols, triols, diamines etc) and/or further polyisocyanates and/or other additives.

According to the sixth aspect of the invention, there is provided an isocyanate terminated polyurethane prepolymer comprising a block copolymer residue having a polycarbonate block, A (-A'-Z'—Z—(Z'-A')$_n$-), wherein A' is a polycarbonate chain having at least 70% carbonate linkages and polyethercarbonate blocks, B, each having up to 50% carbonate linkages and at least 50% ether linkages wherein the residue has a polyblock structure B-A'-Z'—Z—(Z'-A'-B)$_n$, wherein n=t-1 and wherein t=the number of terminal OH group residues on the block A, and wherein Z'—Z—(Z')$_n$ is a starter residue. The isocyanate terminated polyurethane prepolymer of the sixth aspect may include any one or more features as defined in the first aspect of the invention.

Catalysts that may be added to the polyol block copolymer of the first aspect of the present invention and/or compositions of the second aspect of the present invention may be catalysts for the reaction of (poly)isocyanates and a polyol. These catalysts include suitable urethane catalysts such as tertiary amine compounds and/or organometallic compounds.

Optionally, a trimerisation catalyst may be used. An excess of (poly)isocyanate, or more preferably an excess of polymeric isocyanate relative to polyol may be present so that polyisocyanurate ring formation is possible when in the presence of a trimerisation catalyst. Any of these catalysts may be used in conjunction with one or more other trimerisation catalysts.

According to the seventh aspect of the invention, there is provided a lubricant composition comprising a polyol block copolymer according to the first aspect of the present invention.

According to the eighth aspect of the invention, there is provided a surfactant composition comprising a polyol block copolymer according to the first aspect of the present invention.

According to the ninth aspect of the invention, there is also provided a process for producing a polyol block copolymer comprising a first reaction in a first reactor and a second reaction in a second reactor; wherein the first reaction is the reaction of a carbonate catalyst with $CO_2$ and epoxide, in the presence of a starter and optionally a solvent to produce a polycarbonate polyol copolymer and the second reaction is the reaction of a DMC catalyst with the polycarbonate polyol copolymer of the first reaction and $CO_2$ and epoxide to produce a polycarbonate ethercarbonate polyol block copolymer.

The process may further comprise a third reaction comprising the reaction of the polycarbonate ethercarbonate poly block copolymer of the second reaction with a monomer or further polymer in the absence of a DMC catalyst to produce a higher polymer.

The monomer or further polymer may be a (poly)isocyanate and the product of the third reaction may be a polyurethane.

According to the tenth aspect of the present invention, there is also provided a process for producing a polyol block copolymer in a multiple reactor system; the system comprising a first and second reactor wherein a first reaction takes place in the first reactor and a second reaction takes place in the second reactor; wherein the first reaction is the reaction of a carbonate catalyst with $CO_2$ and epoxide, in the presence of a starter and/or solvent to produce a polycarbonate polyol copolymer and the second reaction is the reaction of a DMC catalyst with the polycarbonate polyol compound of the first reaction and $CO_2$ and epoxide to produce the polyol block copolymer.

Adding the components in the separate reactions and reactors may be useful to increase activity of the catalysts and may lead to a more efficient process, compared with a process in which all of the materials are provided at the start of one reaction. Large amounts of some of the components present throughout the reaction may reduce efficiency of the catalysts. Reacting this material in separate reactors may prevent this reduced efficiency of the catalysts and/or may optimise catalyst activity. The reaction conditions of each reactor can be tailored to optimise the reactions for each catalyst.

Additionally, not loading the total amount of each component at the start of the reaction and having the catalyst for the first reaction in a separate reactor to the catalyst for the second reaction, may lead to even catalysis, and more uniform polymer products. This in turn may lead to polymers having a narrower molecular weight distribution, desired ratio and distribution along the chain of ether to carbonate linkages, and/or improved polyol stability.

Having the reactions with the two different catalysts separate and mixing only certain components in the first reaction and adding the remainder in the second reaction may also be useful as the DMC catalyst can be pre-activated. Such pre-activation may be achieved by mixing one or both catalysts with epoxide (and optionally other components). Pre-activation of the DMC catalyst is useful as it enables safe control of the reaction (preventing uncontrolled increase of unreacted monomer content) and removes unpredictable activation periods.

It will be appreciated that the present invention relates to a reaction in which carbonate and ether linkages are added to a growing polymer chain. Having separate reactions allows the first reaction to proceed before a second stage in the reaction. Mixing epoxide, carbonate catalyst, starter compound and carbon dioxide, may permit growth of a polymer having a high number of carbonate linkages. Thereafter, adding the products to the DMC catalyst permits the reaction to proceed by adding a higher incidence of ether linkages to the growing polymer chain. Ether linkages are more thermally stable than carbonate linkages and less prone to degradation by bases such as the amine catalysts used in PU formation. Therefore, applications get the benefits of high carbonate linkages (such as increased strength, chemical resistance, both oil and hydrolysis resistance etc) that are introduced from the A block whilst retaining the stability of the polyol through the predominant ether linkages from the B blocks at the ends of the polymer chains.

In general terms, an aim of the present invention is to control the polymerisation reaction through a two-reactor system, to increase $CO_2$ content of the polyethercarbonate polyols at low pressures (enabling more cost effective processes and plant design) and making a product that has high $CO_2$ content but good stability and application performance. The processes herein may allow the product prepared by such processes to be tailored to the necessary requirements.

The polyol block copolymers of the present invention may be prepared from a suitable epoxide and carbon dioxide in the presence of a starter compound and a carbonate catalyst for the first reaction; and then a suitable epoxide and carbon dioxide in the presence of a double metal cyanide (DMC) catalyst in the second reaction.

The carbonate catalyst of the present invention may be a catalyst that produces a polycarbonate polyol with greater than 76% carbonate linkages, preferably greater than 80% carbonate linkages, more preferably greater than 85% carbonate linkages, most preferably greater than 90% carbonate linkages and such linkage ranges may accordingly be present in block A.

If the epoxide used is asymmetric (e.g. propylene oxide), the catalyst may produce polycarbonate polyols with a high proportion of head to tail linkages, such as greater than 70%, greater than 80% or greater than 90% head to tail linkages. Alternatively, the catalyst may produce polycarbonate polyols with no stereoselectivity, producing polyols with approximately 50% head to tail linkages.

The carbonate catalyst may be heterogeneous or homogeneous.

The carbonate catalyst may be a mono-metallic, bimetallic or multi-metallic homogeneous complex.

The carbonate catalyst may comprise phenol or phenolate ligands.

Typically, the carbonate catalyst may be a bimetallic complex comprising phenol or phenolate ligands. The two metals may be the same or different.

The carbonate catalyst may be a catalyst of formula (IV):

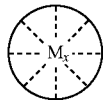
(IV)

wherein:
M is a metal cation represented by $M\text{-}(L)_v$;
x is an integer from 1 to 4, preferably x is 1 or 2;

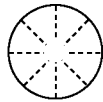

is a multidentate ligand or plurality of multidentate ligands;
L is a coordinating ligand, for example, L may be a neutral ligand, or an anionic ligand, preferably one that is capable of ring-opening an epoxide;
v is an integer that independently satisfies the valency of each M, and/or the preferred coordination geometry of each M or is such that the complex represented by formula (IV) above has an overall neutral charge. For example, each v may independently be 0, 1, 2 or 3, e.g. v may be 1 or 2. When v>1, each L may be different.

The term multidentate ligand includes bidentate, tridentate, tetradentate and higher dentate ligands. Each multidentate ligand may be a macrocyclic ligand or an open ligand.

Such catalysts include those in WO2010022388 (metal salens and derivatives, metal porphyrins, corroles and derivatives, metal tetraaza annulenes and derivatives), WO2010028362 (metal salens and derivatives, metal porphyrins, corroles and derivatives, metal tetraaza annulenes and derivatives), WO2008136591 (metal salens), WO2011105846 (metal salens), WO2014148825 (metal salens), WO2013012895 (metal salens), EP2258745A1 (metal porphyrins and derivatives), JP2008081518A (metal porphyrins and derivatives), CN101412809 (metal salens and derivatives), WO2019126221 (metal aminotriphenol complexes), U.S. Pat. No. 9,018,318 (metal beta-diiminate complexes), U.S. Pat. No. 6,133,402A (metal beta-diiminate complexes) and U.S. Pat. No. 8,278,239 (metal salens and derivatives), the entire contents of which, especially, insofar as they relate to suitable carbonate catalysts for the reaction of $CO_2$ and alkylene oxide, in the presence of a starter and optionally a solvent to produce a polycarbonate polyol copolymer according to block A are incorporated herein by reference.

Such catalysts also include those in WO2009/130470, WO2013/034750, WO2016/012786, WO2016/012785, WO2012037282 and WO2019048878A1 (all bimetallic phenolate complexes), the entire contents of which, especially, insofar as they relate to suitable carbonate catalysts for the reaction of $CO_2$ and epoxide, in the presence of a starter and optionally a solvent to produce a polycarbonate polyol copolymer according to block A are incorporated herein by reference.

The carbonate catalyst may have the following structure:

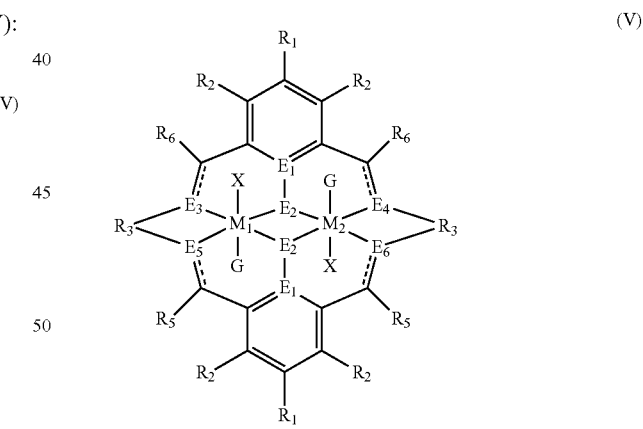
(V)

wherein:
$M_1$ and $M_2$ are independently selected from Zn(II), Cr(II), Co(II), Cu(II), Mn(II), Mg(II), Ni(II), Fe(II), Ti(II), V(II), Cr(III)—X, Co(III)—X, Mn(III)—X, Ni(III)—X, Fe(III)—X, Ca(II), Ge(II), Al(III)—X, Ti(III)—X, V(III)—X, Ge(IV)—$(X)_2$, Y(III)—X, Sc(III)—X or Ti(IV)—$(X)_2$;
$R_1$ and $R_2$ are independently selected from hydrogen, halide, a nitro group, a nitrile group, an imine, an amine, an ether, a silyl group, a silyl ether group, a sulfoxide group, a sulfonyl group, a sulfinate group or an acetylide group or an optionally substituted alkyl, alkenyl, alkynyl, haloalkyl, aryl, heteroaryl, alkoxy, aryloxy, alkylthio, arylthio, alicyclic or heteroalicyclic group;

$R_3$ is independently selected from optionally substituted alkylene, alkenylene, alkynylene, heteroalkylene, heteroalkenylene, heteroalkynylene, arylene, heteroarylene or cycloalkylene, wherein alkylene, alkenylene, alkynylene, heteroalkylene, heteroalkenylene and heteroalkynylene, may optionally be interrupted by aryl, heteroaryl, alicyclic or heteroalicyclic;

$R_5$ is independently selected from H, or optionally substituted aliphatic, heteroaliphatic, alicyclic, heteroalicyclic, aryl, heteroaryl, alkylheteroaryl or alkylaryl;

$E_1$ is C, $E_2$ is O, S or NH or $E_1$ is N and $E_2$ is O;

$E_3$, $E_4$, $E_5$ and $E_6$ are selected from N, $NR_4$, O and S, wherein when $E_3$, $E_4$, $E_5$ or $E_6$ are N, ====== is ——————, and wherein when $E_3$, $E_4$, $E_5$ or $E_6$ are $NR_4$, O or S, ====== is ———;

$R_4$ is independently selected from H, or optionally substituted aliphatic, heteroaliphatic, alicyclic, heteroalicyclic, aryl, heteroaryl, alkylheteroaryl, -alkylC(O)$OR_{19}$ or -alkylC≡N or alkylaryl; X is independently selected from $OC(O)R_x$, $OSO_2R_x$, $OSOR_x$, $OSO(R_x)_2$, $S(O)R_x$, $OR_x$, phosphinate, phosphonate, halide, nitrate, hydroxyl, carbonate, amino, nitro, amido or optionally substituted aliphatic, heteroaliphatic, alicyclic, heteroalicyclic, aryl or heteroaryl, wherein each X may be the same or different and wherein X may form a bridge between $M_1$ and $M_2$;

$R_x$ is independently hydrogen, or optionally substituted aliphatic, haloaliphatic, heteroaliphatic, alicyclic, heteroalicyclic, aryl, alkylaryl or heteroaryl; and G is absent or independently selected from a neutral or anionic donor ligand which is a Lewis base.

Each of the occurrences of the groups $R_1$ and $R_2$ may be the same or different, and $R_1$ and $R_2$ can be the same or different.

DMC catalysts are complicated compounds which comprise at least two metal centres and cyanide ligands. The DMC catalyst may additionally comprise at least one of: one or more complexing agents, water, a metal salt and/or an acid (e.g. in non-stoichiometric amounts).

The first two of the at least two metal centres may be represented by M' and M".

M' may be selected from Zn(II), Ru(II), Ru(III), Fe(II), Ni(II), Mn(II), Co(II), Sn(II), Pb(II), Fe(III), Mo(IV), Mo(VI), Al(III), V(V), V(VI), Sr(II), W(IV), W(VI), Cu(II), and Cr(III), M' is optionally selected from Zn(II), Fe(II), Co(II) and Ni(II), optionally M' is Zn(II).

M" is selected from Fe(II), Fe(III), Co(II), Co(III), Cr(II), Cr(III), Mn(II), Mn(III), Ir(III), Ni(II), Rh(III), Ru(II), V(IV), and V(V), optionally M" is selected from Co(II), Co(III), Fe(II), Fe(III), Cr(III), Ir(III) and Ni(II), optionally M" is selected from Co(II) and Co(III).

It will be appreciated that the above optional definitions for M' and M" may be combined. For example, optionally M' may be selected from Zn(II), Fe(II), Co(II) and Ni(II), and M" may optionally be selected from be Co(II), Co(III), Fe(II), Fe(III), Cr(III), Ir(III) and Ni(II). For example, M' may optionally be Zn(II) and M" may optionally be selected from Co(II) and Co(III).

If a further metal centre(s) is present, the further metal centre may be further selected from the definition of M' or M".

Examples of DMC catalysts which can be used in the process of the invention include those described in U.S. Pat. Nos. 3,427,256, 5,536,883, 6,291,388, 6,486,361, 6,608,231, 7,008,900, 5,482,908, 5,780,584, 5,783,513, 5,158,922, 5,693,584, 7,811,958, 6,835,687, 6,699,961, 6,716,788, 6,977,236, 7,968,754, 7,034,103, 4,826,953, 4,500,704, 7,977,501, 9,315,622, EP-A-1568414, EP-A-1529566, and WO 2015/022290, the entire contents of which, especially, insofar as they relate to DMC catalysts for the production of the block copolymer of the first aspect defined herein or reactions of the ninth or tenth aspect defined herein, are incorporated herein by reference.

It will be appreciated that the DMC catalyst may comprise:

$$M'_d[M''_e(CN)_f]_g$$

wherein M' and M" are as defined above, d, e, f and g are integers, and are chosen such that the DMC catalyst has electroneutrality. Optionally, d is 3. Optionally, e is 1. Optionally f is 6. Optionally g is 2. Optionally, M' is selected from Zn(II), Fe(II), Co(II) and Ni(II), optionally M' is Zn(II). Optionally M" is selected from Co(II), Co(III), Fe(II), Fe(III), Cr(III), Ir(III) and Ni(II), optionally M" is Co(II) or Co(III).

It will be appreciated that any of these optional features may be combined, for example, d is 3, e is 1, f is 6 and g is 2, M' is Zn(II) and M" is Co(III).

Suitable DMC catalysts of the above formula may include zinc hexacyanocobaltate(II), zinc hexacyanoferrate(II), nickel hexacyanoferrate(II), and cobalt hexacyanocobaltate (III).

There has been a lot of development in the field of DMC catalysts, and the skilled person will appreciate that the DMC catalyst may comprise, in addition to the formula above, further additives to enhance the activity of the catalyst. Thus, while the above formula may form the "core" of the DMC catalyst, the DMC catalyst may additionally comprise stoichiometric or non-stoichiometric amounts of one or more additional components, such as at least one complexing agent, an acid, a metal salt, and/or water.

For example, the DMC catalyst may have the following formula:

$$M'_d[M''_e(CN)_f]_g \cdot hM'''X''_i \cdot jR^c \cdot kH_2O \cdot lH_rX'''$$

wherein M', M", X''', d, e, f and g are as defined above. M''' can be M' and/or M". X" is an anion selected from halide, oxide, hydroxide, sulphate, carbonate, cyanide, oxalate, thiocyanate, isocyanate, isothiocyanate, carboxylate and nitrate, optionally X" is halide. i is an integer of 1 or more, and the charge on the anion X" multiplied by i satisfies the valency of M'''. r is an integer that corresponds to the charge on the counterion X'''. For example, when X''' is Cl⁻, r will be 1. l is 0, or a number between 0.1 and 5. Optionally, l is between 0.15 and 1.5.

$R^c$ is a complexing agent or a combination of one or more complexing agents. For example, $R^c$ may be a (poly)ether, a polyether carbonate, a polycarbonate, a poly(tetramethylene ether diol), a ketone, an ester, an amide, an alcohol (e.g. a $C_{1-8}$ alcohol), a urea and the like, such as propylene glycol, polypropylene glycol, (m)ethoxy ethylene glycol, dimethoxyethane, tert-butyl alcohol, ethylene glycol monomethyl ether, diglyme, triglyme, methanol, ethanol, isopropyl alcohol, n-butyl alcohol, isobutyl alcohol, sec-butyl alcohol, 3-buten-1-ol, 2-methyl-3-buten-2-ol, 2-methyl-3-butyn-2-ol, 3-methyl-1-pentyn-3-ol or a combination thereof, for example, $R^c$ may be tert-butyl alcohol, dimethoxyethane, or polypropylene glycol.

As indicated above, more than one complexing agent may be present in the DMC catalysts used in the present invention. Optionally one of the complexing agents of $R_c$ may be a polymeric complexing agent. Optionally, $R_c$ may be a combination of a polymeric complexing agent and a non-polymeric complexing agent. Optionally, a combination of the complexing agents tert-butyl alcohol and polypropylene glycol may be present.

It will be appreciated that if the water, complexing agent, acid and/or metal salt are not present in the DMC catalyst, h, j, k and/or l will be zero respectively. If the water, complexing agent, acid and/or metal salt are present, then h, j, k and/or l are a positive number and may, for example, be between 0 and 20. For example, h may be between 0.1 and 4. j may be between 0.1 and 6. k may be between 0 and 20, e.g. between 0.1 and 10, such as between 0.1 and 5. l may be between 0.1 and 5, such as between 0.15 and 1.5.

The polymeric complexing agent is optionally selected from a polyether, a polycarbonate ether, and a polycarbonate. The polymeric complexing agent may be present in an amount of from about 5% to about 80% by weight of the DMC catalyst, optionally in an amount of from about 10% to about 70% by weight of the DMC catalyst, optionally in an amount of from about 20% to about 50% by weight of the DMC catalyst.

The DMC catalyst, in addition to at least two metal centres and cyanide ligands, may also comprise at least one of: one or more complexing agents, water, a metal salt and/or an acid, optionally in non-stoichiometric amounts.

An exemplary DMC catalyst is of the formula $Zn_3[Co(CN)_6]_2 \cdot hZnCl_2 \cdot kH_2O \cdot j[(CH_3)_3COH]$, wherein h, k and j are as defined above. For example, h may be from 0 to 4 (e.g. from 0.1 to 4), k may be from 0 to 20 (e.g. from 0.1 to 10), and j may be from 0 to 6 (e.g. from 0.1 to 6). As set out above, DMC catalysts are complicated structures, and thus, the above formulae including the additional components is not intended to be limiting. Instead, the skilled person will appreciate that this definition is not exhaustive of the DMC catalysts which are capable of being used in the invention.

The starter compound which may be used in the processes for forming polycarbonate polyols of the present invention comprises at least two groups selected from a hydroxyl group (—OH), a thiol (—SH), an amine having at least one N—H bond (—NHR'), a group having at least one P—OH bond (e.g. —PR'(O)OH, PR'(O)(OH)$_2$ or —P(O)(OR')(OH)), or a carboxylic acid group (—C(O)OH).

Thus, the starter compound which may be used in the processes for forming polycarbonate block polyethercarbonate polyols may be of the formula (III):

 (III) as defined above.

Each reaction may comprise a plurality of starter compounds. The starter compounds for the first and second reaction may be the same or different. Where there are two different starter compounds, there may be two starter compounds in the second reaction, wherein the starter compound in the first reaction is a first starter compound, and wherein the second reaction comprises adding the first crude reaction mixture to the second reactor comprising a second starter compound and double metal cyanide (DMC) catalyst and, optionally, solvent and/or epoxide and/or carbon dioxide. The second reaction of the present invention may be conducted at least about 1 minutes after the first reaction, optionally at least about 5 minutes, optionally at least about 15 minutes, optionally at least about 30 minutes, optionally at least about 1 hour, optionally at least about 2 hours, optionally at least about 5 hours. It will be appreciated that in a continuous reaction these periods are the average period from addition of monomer in the first reactor to transfer of monomer residue into the second reactor.

If polymeric, the starter compound may have a molecular weight of at least about 200 Da or of at most about 1000 Da. For example, having a molecular weight of about 200 to 1000 Da, optionally about 300 to 700 Da, optionally about 400 Da.

The or each starter compound typically has one or more $R^z$ groups, optionally two or more $R^z$ groups, optionally three or more, optionally four or more, optionally five or more, optionally six or more, optionally seven or more, optionally eight or more $R^z$ groups, particularly wherein $R^z$ is hydroxyl.

It will be appreciated that any of the above features may be combined. For example, a may be between 1 and 8 or 2 and 6, each $R^Z$ may be —OH, —C(O)OH or a combination thereof, and Z may be selected from alkylene, heteroalkylene, arylene, or heteroarylene.

Exemplary starter compounds for either reaction include diols such as 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,12-dodecanediol, 1,4-cyclohexanediol, 1,2-diphenol, 1,3-diphenol, 1,4-diphenol, neopentyl glycol, catechol, cyclohexenediol, 1,4-cyclohexanedimethanol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, such as PPG 425, PPG 725, PPG 1000 and the like, triols such as glycerol, benzenetriol, 1,2,4-butanetriol, 1,2,6-hexanetriol, tris(methylalcohol)propane, tris(methylalcohol)ethane, tris(methylalcohol)nitropropane, trimethylol propane, polyethylene oxide triols, polypropylene oxide triols and polyester triols, tetraols such as calix[4]arene, 2,2-bis(methylalcohol)-1,3-propanediol, erythritol, pentaerythritol or polyalkylene glycols (PEGs or PPGs) having 4-OH groups, polyols, such as sorbitol or polyalkylene glycols (PEGs or PPGs) having 5 or more —OH groups, or compounds having mixed functional groups including ethanolamine, diethanolamine, methyldiethanolamine, and phenyldiethanolamine.

For example, the starter compound may be a diol such as 1,2-ethanediol (ethylene glycol), 1-2-propanediol, 1,3-propanediol (propylene glycol), 1,2-butanediol, 1-3-butanediol, 1,4-butanediol, 1,5-pentanediol, 1,6-hexanediol, 1,8-octanediol, 1,10-decanediol, 1,12-dodecanediol, 1,4-cyclohexanediol, 1,2-diphenol, 1,3-diphenol, 1,4-diphenol, neopentyl glycol, catechol, cyclohexenediol, 1,4-cyclohexanedimethanol, poly(caprolactone) diol, dipropylene glycol, diethylene glycol, tripropylene glycol, triethylene glycol, tetraethylene glycol, polypropylene glycols (PPGs) or polyethylene glycols (PEGs) having an Mn of up to about 1500 g/mol, such as PPG 425, PPG 725, PPG 1000 and the like. It will be appreciated that the starter compound may be 1,6-hexanediol, 1,4-cyclohexanedimethanol, 1,12-dodecanediol, poly(caprolactone) diol, PPG 425, PPG 725, or PPG 1000.

Further exemplary starter compounds may include diacids such as oxalic acid, malonic acid, succinic acid, glutaric acid, adipic acid, pimelic acid, suberic acid, azelaic acid, sebacic acid, undecanedioic acid, dodecanedioic acid or other compounds having mixed functional groups such as lactic acid, glycolic acid, 3-hydroxypropanoic acid, 4-hydroxybutanoic acid, 5-hydroxypentanoic acid.

Exemplary monofunctional starter compounds may include substances such as alcohols, phenols, amines, thiols and carboxylic acid, for example, alcohols such as methanol, ethanol, 1- and 2-propanol, 1- and 2-butanol, linear or branched $C_3$-$C_{20}$-monoalcohol such as tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, 1-decanol, 1-dodecanol; phenol, 2-hydroxybiphenyl, 3-hydroxybiphenyl, 4-hydroxybiphenyl, 2-hydroxypyridine, 3-hydroxypyridine, and 4-hydroxypyridine, mono-ethers or esters of ethylene, propylene, polyethylene, polypropylene glycols such as ethylene glycol mono-methyl ether and propylene glycol mono-methyl ether, phenols such as linear or branched $C_3$-$C_{20}$ alkyl substituted phenols, for example nonyl-phenols or octyl phenols, monofunctional carboxylic acids such as formic acid, acetic acid, propionic acid and butyric acid, fatty acids, such as stearic acid, palmitic acid, oleic acid, linoleic acid, linolenic acid, benzoic acid and acrylic acid, and monofunctional thiols such as ethanethiol, propane-1-thiol, propane-2-thiol, butane-1-thiol, 3-methylbutane-1-thiol, 2-butene-1-thiol, and thiophenol, or amines such as butylamine, tert-butylamine, pentylamine, hexylamine, aniline, aziridine, pyrrolidine, piperidine, and morpholine For example, the starter compound may be a monofunctional alcohol such as ethanol, 1-propanol, 2-propanol, 1-butanol, 2-butanol, 1-hexanol, 1-octanol, 1-decanol, 1-dodecanol, a phenol such as nonyl-phenol or octyl phenol or a mono-functional carboxylic acid such as formic acid, acetic acid, propionic acid, butyric acid, fatty acids, such as stearic acid, palmitic acid, oleic acid, linoleic acid, linolenic acid, benzoic acid, acrylic acid.

The ratio of the starter compound, if present, to the carbonate catalyst may be in amounts of from about 1000:1 to about 1:1, for example, from about 750:1 to about 5:1, such as from about 500:1 to about 10:1, e.g. from about 250:1 to about 20:1, or from about 125:1 to about 30:1, or from about 50:1 to about 20:1. These ratios are molar ratios. These ratios are the ratios of the total amount of starter to the total amount of the carbonate catalyst used in the processes. These ratios may be maintained during the course of addition of materials.

The DMC catalyst for the production of a block copolymer according to a first aspect defined herein or according to the ninth and tenth aspect of the invention may be pre-activated. Optionally, the DMC catalyst may be pre-activated in reactor 2 or separately. Optionally, the DMC catalyst may be pre-activated with a starter compound or with the polycarbonate polyol copolymer according to block A of the first aspect or with the reaction product of the first or second reaction. When the DMC catalyst is pre-activated with the reaction product of the first reaction, it may be pre-activated with some or all of the reaction product of the first reaction. The DMC catalyst may be pre-activated with the polyol block copolymer of the first aspect, B-A'-Z'—Z—(Z'-A'-B)$_n$ which may be added into the reactor, or may be the remaining product from a previous reaction, the so-called 'reaction heel'.

The polyol block copolymer according to the ninth and tenth aspect may be according to one or more features of the first aspect of the invention, The product of the first reaction may be a low molecular weight polycarbonate polyol. The preferred molecular weight (Mn) of the polycarbonate polyol depends on the preferred overall molecular weight of the polyol block copolymer. The molecular weight (Mn) of the polycarbonate polyol may be in the range from about 200 to about 4000 Da, from about 200 to about 2000 Da, from about 200 to about 1000 Da, or from about 400 to about 800 Da, as measured by Gel Permeation Chromatography.

The first reaction may produce a generally alternating polycarbonate polyol product.

The polycarbonate or polyester polyol (co)polymer according to block A of the first aspect or the product of the first reaction may be fed into the separate reactor containing a pre-activated DMC catalyst. The first product may be fed into the separate reactor as a crude reaction mixture.

The first reaction of the present invention may be carried out under $CO_2$ pressure of less than 20 bar, preferably less than 10 bar, more preferably less than 8 bar of $CO_2$ pressure. The second reaction of the present invention may be carried out under $CO_2$ pressure of less than 60 bar, preferably less than 20 bar, more preferably less than 10 bar, most preferably less than 5 bar of $CO_2$ pressure.

The $CO_2$ may be added continuously in the first reaction, preferably in the presence of a starter.

The two reactions may both be carried out at a pressure of between about 1 bar and about 60 bar carbon dioxide, optionally about 1 bar and about 40 bar, optionally about 1 bar and about 20 bar, optionally between about 1 bar and about 15 bar, optionally about 1 bar and about 10 bar, optionally about 1 bar and about 5 bar.

The second reaction may be carried out under $CO_2$, or a mixture of $CO_2$ and an inert gas such as $N_2$ or Ar.

The $CO_2$ may be introduced into either reactor via standard methods, such as directly into the headspace or directly into the reaction liquid via standard methods such as a inlet tube, gassing ring or a hollow shaft stirrer. The mixing may be optimised by using different configurations of stirrer, such as single agitators or agitators configured in multiple stages.

The first reaction process being carried out under these relatively low $CO_2$ pressures and the $CO_2$ added continuously can produce a polyol with high $CO_2$ content, under low pressure.

The first reaction may be carried out in a batch, semi-batch or continuous process. In a batch process, all the carbonate catalyst, epoxide, $CO_2$, starter and optionally solvent are present at the beginning of the reaction. In a semi-batch or continuous reaction, one or more of the carbonate catalyst, epoxide, $CO_2$, starter and/or solvent are added into the reactor in a continuous, semi-continuous or discontinuous manner.

The second reaction comprising DMC may be carried out as a continuous process or a semi-batch process. In a semi-batch or continuous process one or more of the DMC catalyst, epoxide, $CO_2$, starter and/or solvent is added into the reaction in a continuous, semi-continuous or discontinuous manner.

Optionally, the crude reaction mixture fed into the second reactor may include an amount of unreacted epoxide and/or $CO_2$ and or starter.

Optionally, the crude reaction mixture feed may include an amount of carbonate catalyst. Optionally, the carbonate catalyst may have been removed prior to the addition to the second reactor.

The polycarbonate product of the first reaction may be referred to as the crude product.

The polycarbonate product of the first reaction may be fed into the second reaction in a single portion or in a continuous, semi-continuous or discontinuous manner, optionally comprising unreacted epoxide and/or carbonate catalyst. Preferably, the product of the first reaction is fed into the second reactor in a continuous manner. This is advantageous as the continuous addition of the product of reaction 1 as a starter for the DMC catalyst allows the DMC catalyst in reactor 2 to operate in a more controlled manner as the ratio of starter to DMC catalyst is always reduced in the reactor. This may prevent deactivation of the DMC catalyst in reactor 2. The polycarbonate polyol copolymer according to block A of the first aspect or the polycarbonate of reaction 1 may be fed into the second reactor prior to DMC activation and may be used during the DMC activation. The DMC catalyst may also be pre-activated with the polyol block copolymer of the first aspect, B-A'-Z'—Z—(Z'-A'-B)$_n$ which may be added into the reactor, or may be the remaining product from a previous reaction, the so-called 'reaction heel'. The temperature of the reaction in the first reactor may be in the range of from about 0° C. to 250° C., preferably from about 40° C. to about 160° C., more preferably from about 50° C. to 120° C.

The temperature of the reaction in the second reactor may be in the range from about 50 to about 160° C., preferably in the range from about 70 to about 140° C., more preferably from about 70 to about 110° C.

The two reactors may be located in a series, or the reactors may be nested. Each reactor may individually be a stirred tank reactor, a loop reactor, a tube reactor or other standard reactor design.

The first reaction may be carried in more than one reactor that feeds the crude reaction mixture into the second reaction, and reactor, continuously. Preferably, reaction 2 is run in a continuous mode.

The product of the first reaction may be stored for subsequent later use in the second reactor.

Advantageously, the two reactions can be run independently to get optimum conditions for each. If the two reactors are nested they may be effective to provide different reaction conditions to each other simultaneously.

Optionally, the polycarbonate polyol may have been stabilised by an acid prior to addition to the second reactor. The acid may be an inorganic or an organic acid. Such acids include, but are not limited to, phosphoric acid derivatives, sulfonic acid derivatives (e.g. methanesulfonic acid, p-toluenesulfonic acid), carboxylic acids (e.g. acetic acid, formic acid, oxalic acid, salicylic acid), mineral acids (e.g. hydrochloric acid, hydrobromic acid, hydroiodic acid), nitric acid or carbonic acid. The acid may be part of an acidic resin, such as an ion exchange resin. Acidic ion exchange resins may be in the form of a polymeric matrix (such as polystyrene or polymethacrylic acid) featuring acidic sites such as strong acidic sites (e.g. sulfonic acid sites) or weak acid sites (e.g. carboxylic acid sites). Example ionic exchange resins include Amberlyst 15, Dowex Marathon MSC and Amberlite IRC 748.

The first and second reactions of the present invention may be carried out in the presence of a solvent, however it will also be appreciated that the processes may also be carried out in the absence of a solvent. When a solvent is present, it may be toluene, hexane, t-butyl acetate, diethyl carbonate, dimethyl carbonate, dioxane, dichlorobenzene, methylene chloride, propylene carbonate, ethylene carbonate, acetone, ethyl acetate, propyl acetate, n-butyl acetate, tetrahydrofuran (THF), etc. The solvent may be toluene, hexane, acetone, ethyl acetate and n-butyl acetate.

The solvent may act to dissolve one or more of the materials. However, the solvent may also act as a carrier, and be used to suspend one or more of the materials in a suspension. Solvent may be required to aid addition of one or more of the materials during the steps of the processes of the present invention.

The process may employ a total amount of solvent, and wherein about 1 to 100% of the total amount of solvent may be mixed in the first reaction, with the remainder added in the second reaction; optionally with about 1 to 75% being mixed in the first reaction, optionally with about 1 to 50%, optionally with about 1 to 40%, optionally with about 1 to 30%, optionally with about 1 to 20%, optionally with about 5 to 20%.

The total amount of the carbonate catalyst may be low, such that the first reaction of the invention may be carried out at low catalytic loading. For example, the catalytic loading of the carbonate catalyst may be in the range of about 1:500-100,000 [total carbonate catalyst]:[total epoxide], such as about 1:750-50,000 [total carbonate catalyst]:[total epoxide], e.g. in the region of about 1:1,000-20,000 [total carbonate catalyst]:[total epoxide], for example in the region of about 1:10,000 [total carbonate catalyst]:[total epoxide]. The ratios above are molar ratios. These ratios are the ratios of the total amount of carbonate catalyst to the total amount of epoxide used in the first reaction.

The process may employ a total amount of carbon dioxide, and about 1 to 100% of the total amount of carbon dioxide incorporated may be in block A. The remainder may be in block B; with optionally about 1 to 75% being incorporated into block A, optionally with about 1 to 50%, optionally with about 1 to 40%, optionally with about 1 to 30%, optionally with about 1 to 20%, optionally with about 5 to 20% being incorporated into block A.

The process may employ a total amount of epoxide, and about 1 to 100% of the total amount of epoxide may be incorporated into block A. The remainder of epoxide may be incorporated into block B; with optionally about 5 to 90% being incorporated into block A, optionally with about 10 to 90%, optionally with about 20 to 90%, optionally with about 40 to 90%, optionally with about 40 to 80%, optionally with about 5 to 50% being incorporated into block A.

The one or more epoxide which is used in the first and second reactions may be any suitable compound containing an epoxide moiety. Exemplary epoxides include ethylene oxide, propylene oxide, butylene oxide and cyclohexene oxide. The epoxide used in the second reactor may be the same or different from the epoxide used in the first reactor. A mixture of one or more epoxides may be present in one or both of the reactors. For example, the first reaction may use ethylene oxide and the second reaction may use propylene oxide, or both reactions may use propylene oxide, or one or both reactions may use a mixture of epoxides such as a mixture of propylene oxide and ethylene oxide. Preferably, propylene oxide and/or ethylene oxide is used in one or both reactors.

The epoxide may be purified (for example by distillation, such as over calcium hydride) prior to reaction with carbon dioxide. For example, the epoxide may be distilled prior to being added.

Examples of epoxides which may be used in the present invention include, but are not limited to, cyclohexene oxide, styrene oxide, ethylene oxide, propylene oxide, butylene oxide, substituted cyclohexene oxides (such as limonene oxide, $C_{10}H_{16}O$ or 2-(3,4-epoxycyclohexyl)ethyltrimethoxysilane, $C_{11}H_{22}O$), alkylene oxides (such as ethylene oxide and substituted ethylene oxides), unsubstituted or substituted oxiranes (such as oxirane, epichlorohydrin, 2-(2-methoxyethoxy)methyl oxirane (MEMO), 2-(2-(2-methoxyethoxy)ethoxy)methyl oxirane (ME2MO), 2-(2-(2-(2-methoxyethoxy)ethoxy)ethoxy)methyl oxirane (ME3MO), 1,2-epoxybutane, glycidyl ethers, glycidyl esters, glycidyl carbonates, vinyl-cyclohexene oxide, 3-phenyl-1,2-epoxypropane, 2,3-epoxybutane, isobutylene oxide, cyclopentene oxide, 2,3-epoxy-1,2,3,4-tetrahydronaphthalene, indene oxide, and functionalized 3,5-dioxaepoxides. Examples of functionalized 3,5-dioxaepoxides include:

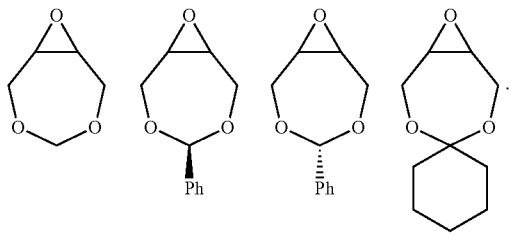

The epoxide moiety may be a glycidyl ether, glycidyl ester or glycidyl carbonate. Examples of glycidyl ethers, glycidyl esters glycidyl carbonates include:

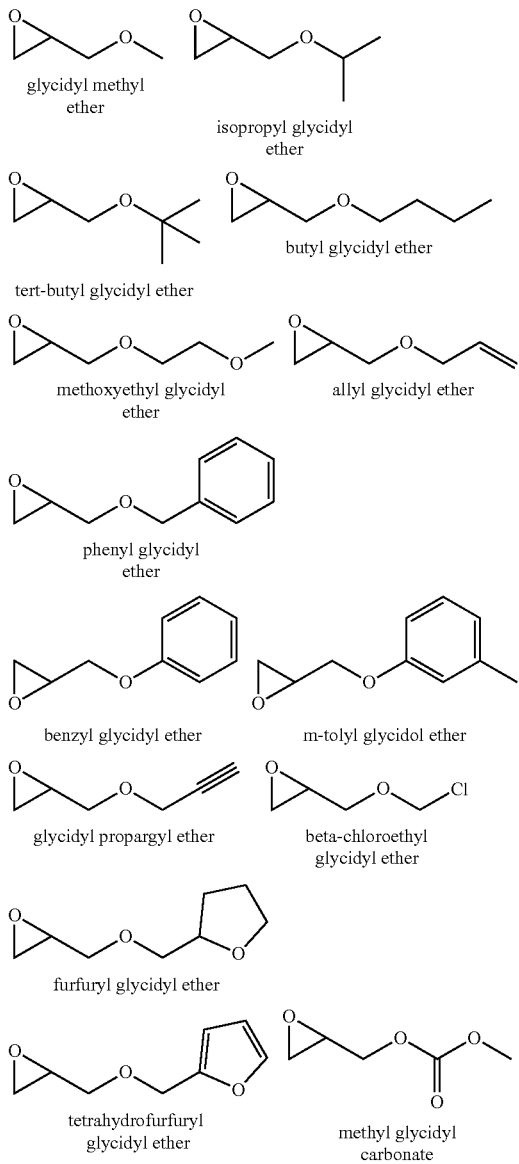

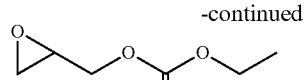

ethyl glycidyl carbonate

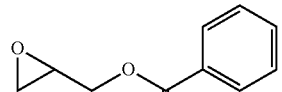

glycidyl benzoate

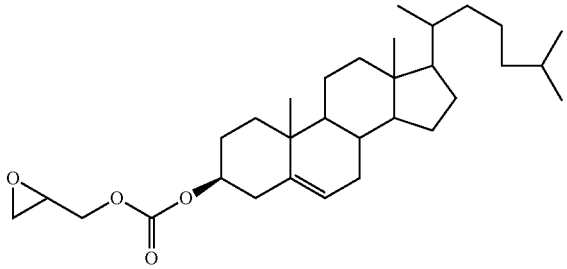

cholestryl glycidyl carbonate

As noted above, the epoxide substrate may contain more than one epoxide moiety, i.e. it may be a bis-epoxide, a tris-epoxide, or a multi-epoxide containing moiety. Examples of compounds including more than one epoxide moiety include, bis-epoxybutane, bis-epoxyoctane, bis-epoxydecane, bisphenol A diglycidyl ether and 3,4-epoxycyclohexylmethyl-3',4'-epoxycyclohexanecarboxylate. It will be understood that reactions carried out in the presence of one or more compounds having more than one epoxide moiety may lead to cross-linking in the resulting polymer.

Optionally, between 0.1 and 20% of the total epoxide in the first reaction may be an epoxide substrate containing more than one epoxide moiety. Preferably, the multi-epoxide substrate is a bis-epoxide.

The skilled person will appreciate that the epoxide can be obtained from "green" or renewable resources. The epoxide may be obtained from a (poly)unsaturated compound, such as those deriving from a fatty acid and/or terpene, obtained using standard oxidation chemistries.

The epoxide moiety may contain —OH moieties, or protected —OH moieties. The —OH moieties may be protected by any suitable protecting group. Suitable protecting groups include methyl or other alkyl groups, benzyl, allyl, tert-butyl, tetrahydropyranyl (THP), methoxymethyl (MOM), acetyl (C(O)alkyl), benzolyl (C(O)Ph), dimethoxytrityl (DMT), methoxyethoxymethyl (MEM), p-methoxybenzyl (PMB), trityl, silyl (such as trimethylsilyl (TMS), t-butyldimethylsilyl (TBDMS), t-butyldiphenylsilyl (TBDPS), tri-iso-propylsilyloxymethyl (TOM), and triisopropylsilyl (TIPS)), (4-methoxyphenyl)diphenylmethyl (MMT), tetrahydrofuranyl (THF), and tetrahydropyranyl (THP).

The epoxide optionally has a purity of at least 98%, optionally >99%.

The rate at which the materials are added may be selected such that the temperature of the (exothermic) reactions does not exceed a selected temperature (i.e. that the materials are added slowly enough to allow any excess heat to dissipate such that the temperature of the remains approximately constant). The rate at which the materials are added may be selected such that the epoxide concentration does not exceed a selected epoxide concentration.

The process may produce a polyol with a polydispersity between 1.0 and 2.0, preferably between 1.0 and 1.8, more preferably between 1.0 and 1.5, most preferably between 1.0 and 1.3.

The process may comprise mixing double metal cyanide (DMC) catalyst, epoxide, starter and optionally carbon dioxide and/or solvent to form a pre-activated mixture and adding the pre-activated mixture to the second reactor either before or after the crude reaction mixture of the first reaction, to form the second reaction mixture. However, this may take place continuously so that the pre-activated mixture is added at the same time as the crude reaction mixture. The pre-activated mixture may also be formed in the second reactor by mixing the DMC catalyst, epoxide, starter and optionally carbon dioxide and/or solvent. The pre-activation may occur at a temperature of about 50° C. to 160° C., preferably between about 70° C. to 140° C., more preferably about 90° C. to 140° C. The pre-activated mixture may be mixed at a temperature of between about 50 to 160° C. prior to contact with the crude reaction mixture, optionally between about 70 to 140° C.

In the overall reaction process, the amount of said carbonate catalyst and the amount of said double metal cyanide (DMC) catalyst may be at a predetermined weight ratio of from about 300:1 to about 1:100 to one another, for example, from about 120:1 to about 1:75, such as from about 40:1 to about 1:50, e.g. from about 30:1 to about 1:30 such as from about 20:1 to about 1:1, for example from about 10:1 to about 2:1, e.g. from about 5:1 to about 1:5. The processes of the present invention can be carried out on any scale. The process may be carried out on an industrial scale. As will be understood by the skilled person, catalytic reactions are generally exothermic. The generation of heat during a small-scale reaction is unlikely to be problematic, as any increase in temperature can be controlled relatively easily by, for example, the use of an ice bath. With larger scale reactions, and particularly industrial scale reactions, the generation of heat during a reaction can be problematic and potentially dangerous. Thus, the gradual addition of materials may allow the rate of the catalytic reaction to be controlled and can minimise the build-up of excess heat. The rate of the reaction may be controlled, for example, by adjusting the flow rate of the materials during addition. Thus, the processes of the present invention have particular advantages if applied to large, industrial scale catalytic reactions.

The temperature may increase or decrease during the course of the processes of the invention.

The amount of said carbonate catalyst and the amount of said double metal cyanide (DMC) catalyst will vary depending on which carbonate catalyst and DMC catalyst is used.

Methods
Gel Permeation Chromatography

GPC measurements were carried out against narrow polydispersity poly(ethylene glycol) or polystyrene standards in THF using an Agilent 1260 Infinity machine equipped with Agilent PLgel Mixed-D columns.

Definitions

For the purpose of the present invention, an aliphatic group is a hydrocarbon moiety that may be straight chain (i.e. unbranched) branched, or cyclic and may be completely saturated, or contain one or more units of unsaturation, but which is not aromatic. The term "unsaturated" means a moiety that has one or more double and/or triple bonds. The term "aliphatic" is therefore intended to encompass alkyl, cycloalkyl, alkenyl cycloalkenyl, alkynyl or cycloalkenyl groups, and combinations thereof.

An aliphatic group is optionally a $C_{1-30}$ aliphatic group, that is, an aliphatic group with 1, 2, 3, 4, 5, 6, 7, 8, 9, 10, 11, 12, 13, 14, 15, 16, 17, 18, 19, 20, 21, 22, 23, 24, 25, 26, 27, 28, 29 or 30 carbon atoms. Optionally, an aliphatic group is a $C_{1-15}$ aliphatic, optionally a $C_{1-12}$ aliphatic, optionally a $C_{1-10}$ aliphatic, optionally a $C_{1-8}$ aliphatic, such as a $C_{1-6}$ aliphatic group. Suitable aliphatic groups include linear or branched, alkyl, alkenyl and alkynyl groups, and mixtures thereof such as (cycloalkyl)alkyl groups, (cycloalkenyl) alkyl groups and (cycloalkyl)alkenyl groups.

The term "alkyl," as used herein, refers to saturated, straight- or branched-chain hydrocarbon radicals derived by removal of a single hydrogen atom from an aliphatic moiety. An alkyl group is optionally a "$C_{1-20}$ alkyl group", that is an alkyl group that is a straight or branched chain with 1 to 20 carbons. The alkyl group therefore has 1, 2, 3, 4, 5, 6, 7, 8, 9, 10, 11, 12, 13, 14, 15, 16, 17, 18, 19 or 20 carbon atoms. Optionally, an alkyl group is a $C_{1-15}$ alkyl, optionally a $C_{1-12}$ alkyl, optionally a $C_{1-10}$ alkyl, optionally a $C_{1-8}$ alkyl, optionally a $C_{1-6}$ alkyl group. Specifically, examples of "$C_{1-20}$ alkyl group" include methyl group, ethyl group, n-propyl group, iso-propyl group, n-butyl group, iso-butyl group, sec-butyl group, tert-butyl group, sec-pentyl, iso-pentyl, n-pentyl group, neopentyl, n-hexyl group, sec-hexyl, n-heptyl group, n-octyl group, n-nonyl group, n-decyl group, n-undecyl group, n-dodecyl group, n-tridecyl group, n-tetradecyl group, n-pentadecyl group, n-hexadecyl group, n-heptadecyl group, n-octadecyl group, n-nonadecyl group, n-eicosyl group, 1,1-dimethylpropyl group, 1,2-dimethylpropyl group, 2,2-dimethylpropyl group, 1-ethylpropyl group, n-hexyl group, 1-ethyl-2-methylpropyl group, 1,1,2-trimethylpropyl group, 1-ethylbutyl group, 1-methylbutyl group, 2-methylbutyl group, 1,1-dimethylbutyl group, 1,2-dimethylbutyl group, 2,2-dimethylbutyl group, 1,3-dimethylbutyl group, 2,3-dimethylbutyl group, 2-ethylbutyl group, 2-methylpentyl group, 3-methylpentyl group and the like.

The term "alkenyl," as used herein, denotes a group derived from the removal of a single hydrogen atom from a straight- or branched-chain aliphatic moiety having at least one carbon-carbon double bond. The term "alkynyl," as used herein, refers to a group derived from the removal of a single hydrogen atom from a straight- or branched-chain aliphatic moiety having at least one carbon-carbon triple bond. Alkenyl and alkynyl groups are optionally "$C_{2-20}$ alkenyl" and "$C_{2-20}$ alkynyl", optionally "$C_{2-15}$ alkenyl" and "$C_{2-15}$ alkynyl", optionally "$C_{2-12}$ alkenyl" and "$C_{2-12}$ alkynyl", optionally "$C_{2-10}$ alkenyl" and "$C_{2-10}$ alkynyl", optionally "$C_{2-8}$ alkenyl" and "$C_{2-8}$ alkynyl", optionally "$C_{2-8}$ alkenyl" and "$C_{2-6}$ alkynyl" groups, respectively. Examples of alkenyl groups include ethenyl, propenyl, allyl, 1,3-butadienyl, butenyl, 1-methyl-2-buten-1-yl, allyl, 1,3-butadienyl and allenyl. Examples of alkynyl groups include ethynyl, 2-propynyl (propargyl) and 1-propynyl.

The terms "cycloaliphatic", "carbocycle", or "carbocyclic" as used herein refer to a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Optionally, an alicyclic group has from 3 to 15, optionally from 3 to 12, optionally from 3 to 10, optionally from 3 to 8 carbon atoms, optionally from 3 to 6 carbons atoms. The terms "cycloaliphatic", "carbocycle" or "carbocyclic" also include aliphatic rings that are fused to one or more aromatic or nonaromatic rings, such as tetrahydronaphthyl rings, where the point of attachment is on the aliphatic ring. A carbocyclic group may be polycyclic, e.g. bicyclic or tricyclic. It will be appreciated that the alicyclic group may comprise an alicyclic ring bearing one or more linking or non-linking alkyl substituents, such as —$CH_2$-cyclohexyl. Specifically, examples of carbocycles include cyclopropane, cyclobutane, cyclopentane, cyclohexane, bicycle[2,2,1]heptane, norborene, phenyl, cyclohexene, naphthalene, spiro[4.5]decane, cycloheptane, adamantane and cyclooctane.

A heteroaliphatic group (including heteroalkyl, heteroalkenyl and heteroalkynyl) is an aliphatic group as described above, which additionally contains one or more heteroatoms. Heteroaliphatic groups therefore optionally contain from 2 to 21 atoms, optionally from 2 to 16 atoms, optionally from 2 to 13 atoms, optionally from 2 to 11 atoms, optionally from 2 to 9 atoms, optionally from 2 to 7 atoms, wherein at least one atom is a carbon atom. Optional heteroatoms are selected from O, S, N, P and Si. When heteroaliphatic groups have two or more heteroatoms, the heteroatoms may be the same or different. Heteroaliphatic groups may be substituted or unsubstituted, branched or unbranched, cyclic or acyclic, and include saturated, unsaturated or partially unsaturated groups.

An alicyclic group is a saturated or partially unsaturated cyclic aliphatic monocyclic or polycyclic (including fused, bridging and spiro-fused) ring system which has from 3 to 20 carbon atoms, that is an alicyclic group with 3, 4, 5, 6, 7, 8, 9, 10, 11, 12, 13, 14, 15, 16, 17, 18, 19 or 20 carbon atoms. Optionally, an alicyclic group has from 3 to 15, optionally from 3 to 12, optionally from 3 to 10, optionally from 3 to 8 carbon atoms, optionally from 3 to 6 carbons atoms. The term "alicyclic" encompasses cycloalkyl, cycloalkenyl and cycloalkynyl groups. It will be appreciated that the alicyclic group may comprise an alicyclic ring bearing one or more linking or non-linking alkyl substituents, such as —$CH_2$—cyclohexyl. Specifically, examples of the $C_{3-20}$ cycloalkyl group include cyclopropyl, cyclobutyl, cyclopentyl, cyclohexyl, cycloheptyl, adamantyl and cyclooctyl.

A heteroalicyclic group is an alicyclic group as defined above which has, in addition to carbon atoms, one or more ring heteroatoms, which are optionally selected from O, S, N, P and Si. Heteroalicyclic groups optionally contain from one to four heteroatoms, which may be the same or different. Heteroalicyclic groups optionally contain from 5 to 20 atoms, optionally from 5 to 14 atoms, optionally from 5 to 12 atoms.

An aryl group or aryl ring is a monocyclic or polycyclic ring system having from 5 to 20 carbon atoms, wherein at least one ring in the system is aromatic and wherein each ring in the system contains three to twelve ring members. The term "aryl" can be used alone or as part of a larger moiety as in "aralkyl", "aralkoxy", or "aryloxyalkyl". An aryl group is optionally a "$C_{6-12}$ aryl group" and is an aryl group constituted by 6, 7, 8, 9, 10, 11 or 12 carbon atoms and includes condensed ring groups such as monocyclic ring group, or bicyclic ring group and the like. Specifically, examples of "$C_{6-10}$ aryl group" include phenyl group, biphenyl group, indenyl group, anthracyl group, naphthyl group or azulenyl group and the like. It should be noted that condensed rings such as indan, benzofuran, phthalimide, phenanthridine and tetrahydro naphthalene are also included in the aryl group.

The term "heteroaryl" used alone or as part of another term (such as "heteroaralkyl", or "heteroaralkoxy") refers to groups having 5 to 14 ring atoms, optionally 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of nitrogen. The term "heteroaryl" also includes groups in which a heteroaryl ring is fused to one or more aryl, cycloaliphatic, or heterocyclyl rings, where the radical or point of attachment is on the heteroaromatic ring. Examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one.

Thus, a heteroaryl group may be mono- or polycyclic.

The term "heteroaralkyl" refers to an alkyl group substituted by a heteroaryl, wherein the alkyl and heteroaryl portions independently are optionally substituted.

As used herein, the terms "heterocycle", "heterocyclyl", "heterocyclic radical", and "heterocyclic ring" are used interchangeably and refer to a stable 5- to 7-membered monocyclic or 7-14-membered bicyclic heterocyclic moiety that is saturated, partially unsaturated, or aromatic and having, in addition to carbon atoms, one or more, optionally one to four, heteroatoms, as defined above. When used in reference to a ring atom of a heterocycle, the term "nitrogen" includes a substituted nitrogen.

Examples of alicyclic, heteroalicyclic, aryl and heteroaryl groups include but are not limited to cyclohexyl, phenyl, acridine, benzimidazole, benzofuran, benzothiophene, benzoxazole, benzothiazole, carbazole, cinnoline, dioxin, dioxane, dioxolane, dithiane, dithiazine, dithiazole, dithiolane, furan, imidazole, imidazoline, imidazolidine, indole, indoline, indolizine, indazole, isoindole, isoquinoline, isoxazole, isothiazole, morpholine, napthyridine, oxazole, oxadiazole, oxathiazole, oxathiazolidine, oxazine, oxadiazine, phenazine, phenothiazine, phenoxazine, phthalazine, piperazine, piperidine, pteridine, purine, pyran, pyrazine, pyrazole, pyrazoline, pyrazolidine, pyridazine, pyridine, pyrimidine, pyrrole, pyrrolidine, pyrroline, quinoline, quinoxaline, quinazoline, quinolizine, tetrahydrofuran, tetrazine, tetrazole, thiophene, thiadiazine, thiadiazole, thiatriazole, thiazine, thiazole, thiomorpholine, thianaphthalene, thiopyran, triazine, triazole, and trithiane.

The term "halide", "halo" and "halogen" are used interchangeably and, as used herein mean a fluorine atom, a chlorine atom, a bromine atom, an iodine atom and the like, optionally a fluorine atom, a bromine atom or a chlorine atom, and optionally a fluorine atom.

A haloalkyl group is optionally a "$C_{1-20}$ haloalkyl group", optionally a "$C_{1-15}$ haloalkyl group", optionally a "$C_{1-12}$ haloalkyl group", optionally a "$C_{1-10}$ haloalkyl group", optionally a "$C_{1-8}$ haloalkyl group", optionally a "$C_{1-6}$ haloalkyl group" and is a $C_{1-20}$ alkyl, a $C_{1-15}$ alkyl, a $C_{1-12}$ alkyl, a $C_{1-10}$ alkyl, a $C_{1-8}$ alkyl, or a $C_{1-6}$ alkyl group, respectively, as described above substituted with at least one halogen atom, optionally 1, 2 or 3 halogen atom(s). The term "haloalkyl" encompasses fluorinated or chlorinated groups, including perfluorinated compounds. Specifically, examples of "$C_{1-20}$ haloalkyl group" include fluoromethyl group, difluoromethyl group, trifluoromethyl group, fluoroethyl group, difluoroethyl group, trifluoroethyl group, chloromethyl group, bromomethyl group, iodomethyl group and the like.

The term "acyl" as used herein refers to a group having a formula —C(O)R where R is hydrogen or an optionally substituted aliphatic, aryl, or heterocyclic group.

An alkoxy group is optionally a "$C_{1-20}$ alkoxy group", optionally a "$C_{1-15}$ alkoxy group", optionally a "$C_{1-12}$ alkoxy group", optionally a "$C_{1-10}$ alkoxy group", optionally a "$C_{1-8}$ alkoxy group", optionally a "$C_{1-6}$ alkoxy group" and is an oxy group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively. Specifically, examples of "$C_{1-20}$ alkoxy group" include methoxy group, ethoxy group, n-propoxy group, iso-propoxy group, n-butoxy group, iso-butoxy group, sec-butoxy group, tert-butoxy group, n-pentyloxy group, iso-pentyloxy group, sec-pentyloxy group, n-hexyloxy group, iso-hexyloxy group, n-hexyloxy group, n-heptyloxy group, n-octyloxy group, n-nonyloxy group, n-decyloxy group, n-undecyloxy group, n-dodecyloxy group, n-tridecyloxy group, n-tetradecyloxy group, n-pentadecyloxy group, n-hexadecyloxy group, n-heptadecyloxy group, n-octadecyloxy group, n-nonadecyloxy group, n-eicosyloxy group, 1,1-dimethylpropoxy group, 1,2-dimethylpropoxy group, 2,2-dimethylpropoxy group, 2-methylbutoxy group, 1-ethyl-2-methylpropoxy group, 1,1,2-trimethylpropoxy group, 1,1-dimethylbutoxy group, 1,2-dimethylbutoxy group, 2,2-dimethylbutoxy group, 2,3-dimethylbutoxy group, 1,3-dimethylbutoxy group, 2-ethylbutoxy group, 2-methylpentyloxy group, 3-methylpentyloxy group and the like.

An aryloxy group is optionally a "$C_{5-20}$ aryloxy group", optionally a "$C_{6-12}$ aryloxy group", optionally a "$C_{6-10}$ aryloxy group" and is an oxy group that is bonded to the previously defined $C_{5-20}$ aryl, $C_{6-12}$ aryl, or $C_{6-10}$ aryl group respectively.

An alkylthio group is optionally a "$C_{1-20}$ alkylthio group", optionally a "$C_{1-15}$ alkylthio group", optionally a "$C_{1-12}$ alkylthio group", optionally a "$C_{1-10}$ alkylthio group", optionally a "$C_{1-8}$ alkylthio group", optionally a "$C_{1-6}$ alkylthio group" and is a thio (—S—) group that is bonded to the previously defined $C_{1-20}$ alkyl, $C_{1-15}$ alkyl, $C_{1-12}$ alkyl, $C_{1-10}$ alkyl, $C_{1-8}$ alkyl, or $C_{1-6}$ alkyl group respectively.

An arylthio group is optionally a "$C_{5-20}$ arylthio group", optionally a "$C_{6-12}$ arylthio group", optionally a "$C_{6-10}$ arylthio group" and is a thio (—S—) group that is bonded to the previously defined $C_{5-20}$ aryl, $C_{6-12}$ aryl, or $C_{6-10}$ aryl group respectively.

An alkylaryl group is optionally a "$C_{6-12}$ aryl $C_{1-20}$ alkyl group", optionally a "$C_{6-12}$ aryl $C_{1-16}$ alkyl group", optionally a "$C_{6-12}$ aryl $C_{1-6}$ alkyl group" and is an aryl group as defined above bonded at any position to an alkyl group as defined above. The point of attachment of the alkylaryl group to a molecule may be via the alkyl portion and thus, optionally, the alkylaryl group is —CH$_2$-Ph or —CH$_2$CH$_2$-Ph. An alkylaryl group can also be referred to as "aralkyl".

A silyl group is optionally —Si(R$_s$)$_3$, wherein each R$_s$ can be independently an aliphatic, heteroaliphatic, alicyclic, heteroalicyclic, aryl or heteroaryl group as defined above. Optionally, each R$_s$ is independently an unsubstituted aliphatic, alicyclic or aryl. Optionally, each R$_s$ is an alkyl group selected from methyl, ethyl or propyl.

A silyl ether group is optionally a group OSi(R$_6$)$_3$ wherein each R$_6$ can be independently an aliphatic, heteroaliphatic, alicyclic, heteroalicyclic, aryl or heteroaryl group as defined above. Each R$_6$ can be independently an unsubstituted aliphatic, alicyclic or aryl. Optionally, each R$_6$ is an optionally substituted phenyl or optionally substituted alkyl group selected from methyl, ethyl, propyl or butyl (such as n-butyl (nBu) or tert-butyl (tBu)). Exemplary silyl ether groups include OSi(Me)$_3$, OSi(Et)$_3$, OSi(Ph)$_3$, OSi(Me)$_2$(tBu), OSi(tBu)$_3$ and OSi(Ph)$_2$(tBu).

A nitrile group (also referred to as a cyano group) is a group CN.

An imine group is a group —CRNR, optionally —CHNR$_7$ wherein R$_7$ is an aliphatic, heteroaliphatic, alicyclic, heteroalicyclic, aryl or heteroaryl group as defined above. R$_7$ may be unsubstituted aliphatic, alicyclic or aryl. Optionally R$_7$ is an alkyl group selected from methyl, ethyl or propyl.

An acetylide group contains a triple bond —C≡C—R$_9$, optionally wherein R$_9$ can be hydrogen, an aliphatic, heteroaliphatic, alicyclic, heteroalicyclic, aryl or heteroaryl group as defined above. For the purposes of the invention when R$_9$ is alkyl, the triple bond can be present at any position along the alkyl chain. R$_9$ may be unsubstituted aliphatic, alicyclic or aryl. Optionally R$_9$ is methyl, ethyl, propyl or phenyl.

An amino group is optionally —NH$_2$, —NHR$_{10}$ or —N(R$_{10}$)$_2$ wherein R$_{10}$ can be an aliphatic, heteroaliphatic, alicyclic, heteroalicyclic, a silyl group, aryl or heteroaryl group as defined above. It will be appreciated that when the amino group is N(R$_{10}$)$_2$, each R$_{10}$ group can be the same or different. Each R$_{10}$ may independently an unsubstituted aliphatic, alicyclic, silyl or aryl. Optionally R$_{10}$ is methyl, ethyl, propyl, SiMe$_3$ or phenyl.

An amido group is optionally —NR$_{11}$C(O)— or —C(O)—NR$_{11}$— wherein R$_{11}$ can be hydrogen, an aliphatic, heteroaliphatic, alicyclic, heteroalicyclic, aryl or heteroaryl group as defined above. R$_{11}$ may be unsubstituted aliphatic, alicyclic or aryl. Optionally R$_{11}$ is hydrogen, methyl, ethyl, propyl or phenyl. The amido group may be terminated by hydrogen, an aliphatic, heteroaliphatic, alicyclic, heteroalicyclic, aryl or heteroaryl group.

An ester group, unless otherwise defined herein, is optionally -OC(O)R$_{12}$— or —C(O)OR$_{12}$— wherein R$_{12}$ can be an aliphatic, heteroaliphatic, alicyclic, heteroalicyclic, aryl or heteroaryl group as defined above. R$_{12}$ may be unsubstituted aliphatic, alicyclic or aryl. Optionally R$_{12}$ is methyl, ethyl, propyl or phenyl. The ester group may be terminated by an aliphatic, heteroaliphatic, alicyclic, heteroalicyclic, aryl or heteroaryl group. It will be appreciated that if R$_{12}$ is hydrogen, then the group defined by —OC(O)R$_{12}$— or —C(O)OR$_{12}$-will be a carboxylic acid group.

A sulfoxide is optionally —S(O)R$_{13}$ and a sulfonyl group is optionally —S(O)$_2$R$_{13}$ wherein R$_{13}$ can be an aliphatic, heteroaliphatic, alicyclic, heteroalicyclic, aryl or heteroaryl group as defined above. R$_{13}$ may be unsubstituted aliphatic, alicyclic or aryl. Optionally R$_{13}$ is methyl, ethyl, propyl or phenyl.

A carboxylate group is optionally —OC(O)R$_{14}$, wherein R$_{14}$ can be hydrogen, an aliphatic, heteroaliphatic, alicyclic, heteroalicyclic, aryl or heteroaryl group as defined above. R$_{14}$ may be unsubstituted aliphatic, alicyclic or aryl. Optionally R$_{14}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An acetamide is optionally MeC(O)N(R$_{15}$)$_2$ wherein R$_{15}$ can be hydrogen, an aliphatic, heteroaliphatic, alicyclic, heteroalicyclic, aryl or heteroaryl group as defined above. R$_{15}$ may be unsubstituted aliphatic, alicyclic or aryl. Optionally R$_{15}$ is hydrogen, methyl, ethyl, propyl or phenyl.

A phosphinate group is optionally -OP(O)($R_{16}$)$_2$ or —P(O)(O$R_{16}$)($R_{16}$) wherein each $R_{16}$ is independently selected from hydrogen, or an aliphatic, heteroaliphatic, alicyclic, heteroalicyclic, aryl or heteroaryl group as defined above. $R_{16}$ may be aliphatic, alicyclic or aryl, which are optionally substituted by aliphatic, alicyclic, aryl or $C_{1-6}$ alkoxy. Optionally $R_{16}$ is optionally substituted aryl or $C_{1-20}$ alkyl, optionally phenyl optionally substituted by $C_{1-6}$ alkoxy (optionally methoxy) or unsubstituted $C_{1-20}$ alkyl (such as hexyl, octyl, decyl, dodecyl, tetradecyl, hexadecyl, stearyl). A phosphonate group is optionally —P(O)(O$R_{16}$)$_2$ wherein $R_{16}$ is as defined above. It will be appreciated that when either or both of $R_{16}$ is hydrogen for the group —P(O)(O$R_{18}$)$_2$, then the group defined by —P(O)(O$R_{18}$)$_2$ will be a phosphonic acid group.

A sulfinate group is optionally —S(O)O$R_{17}$ or —OS(O)$R_{17}$ wherein $R_{17}$ can be hydrogen, an aliphatic, heteroaliphatic, haloaliphatic, alicyclic, heteroalicyclic, aryl or heteroaryl group as defined above. $R_{17}$ may be unsubstituted aliphatic, alicyclic or aryl. Optionally $R_{17}$ is hydrogen, methyl, ethyl, propyl or phenyl. It will be appreciated that if $R_{17}$ is hydrogen, then the group defined by —S(O)O$R_{17}$ will be a sulfonic acid group.

A carbonate group is optionally —OC(O)O$R_{18}$, wherein $R_{18}$ can be hydrogen, an aliphatic, heteroaliphatic, alicyclic, heteroalicyclic, aryl or heteroaryl group as defined above. $R_{18}$ may be optionally substituted aliphatic, alicyclic or aryl. Optionally $R_{18}$ is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl, cyclohexyl, benzyl or adamantyl. It will be appreciated that if $R_{17}$ is hydrogen, then the group defined by —OC(O)O$R_{18}$ will be a carbonic acid group.

A carbonate functional group is —OC(O)O— and may be derived from a suitable source. Generally, it is derived from $CO_2$.

In an -alkylC(O)O$R_{19}$ or -alkylC(O)$R_{19}$ group, $R_{19}$ can be hydrogen, an aliphatic, heteroaliphatic, alicyclic, heteroalicyclic, aryl or heteroaryl group as defined above. $R_{19}$ may be unsubstituted aliphatic, alicyclic or aryl. Optionally Rig is hydrogen, methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

An ether group is optionally —O$R_{20}$ wherein $R_{20}$ can be an aliphatic, heteroaliphatic, alicyclic, heteroalicyclic, aryl or heteroaryl group as defined above. $R_{20}$ may be unsubstituted aliphatic, alicyclic or aryl. Optionally $R_{20}$ is methyl, ethyl, propyl, butyl (for example n-butyl, isobutyl or tert-butyl), phenyl, pentafluorophenyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, trifluoromethyl or adamantyl.

It will be appreciated that where any of the above groups are present in a Lewis base G, one or more additional R groups may be present, as appropriate, to complete the valency. For example, in the context of an amino group, an additional R group may be present to give RNH$R_{10}$, wherein R is hydrogen, an optionally substituted aliphatic, heteroaliphatic, alicyclic, heteroalicyclic, aryl or heteroaryl group as defined above. Optionally, R is hydrogen or aliphatic, alicyclic or aryl.

When the suffix "ene" is used in conjunction with a chemical group, e.g. "alkylene", this is intended to mean the group as defined herein having two points of attachment to other groups. As used herein, the term "alkylene", by itself or as part of another substituent, refers to alkyl groups that are divalent, i.e., with two points of attachment to two other groups.

As used herein, the term "optionally substituted" means that one or more of the hydrogen atoms in the optionally substituted moiety is replaced by a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position.

Combinations of substituents envisioned by this invention are optionally those that result in the formation of stable compounds. The term "stable", as used herein, refers to compounds that are chemically feasible and can exist for long enough at room temperature i.e. (16-25° C.) to allow for their detection, isolation and/or use in chemical synthesis.

Optional substituents for use in the present invention include, but are not limited to, halogen, hydroxy, nitro, carboxylate, carbonate, alkoxy, aryloxy, alkylthio, arylthio, heteroaryloxy, alkylaryl, amino, amido, imine, nitrile, silyl, silyl ether, ester, sulfoxide, sulfonyl, acetylide, phosphinate, sulfonate or optionally substituted aliphatic, heteroaliphatic, alicyclic, heteroalicyclic, aryl or heteroaryl groups (for example, optionally substituted by halogen, hydroxy, nitro, carbonate, alkoxy, aryloxy, alkylthio, arylthio, amino, imine, nitrile, silyl, sulfoxide, sulfonyl, phosphinate, sulfonate or acetylide).

It will be appreciated that although in formula (V), the groups X and G are illustrated as being associated with a single $M_1$ or $M_2$ metal centre, one or more X and G groups may form a bridge between the $M_1$ and $M_2$ metal centres.

For the purposes of the present invention, the epoxide substrate is not limited. The term epoxide therefore relates to any compound comprising an epoxide moiety (i.e. a substituted or unsubstituted oxirane compound). Substituted oxiranes include monosubstituted oxiranes, disubstituted oxiranes, trisubstituted oxiranes, and tetrasubstituted oxiranes. Epoxides may comprise a single oxirane moiety. Epoxides may comprise two or more oxirane moieties.

It will be understood that the term "an epoxide" is intended to encompass one or more epoxides. In other words, the term "an epoxide" refers to a single epoxide, or a mixture of two or more different epoxides. For example, the epoxide substrate may be a mixture of ethylene oxide and propylene oxide, a mixture of cyclohexene oxide and propylene oxide, a mixture of ethylene oxide and cyclohexene oxide, or a mixture of ethylene oxide, propylene oxide and cyclohexene oxide.

The terms polycarbonate ethercarbonate polyol block copolymer and polycarbonate block polyethercarbonate polyol or used interchangeably. The term polycarbonate block polyethercarbonate polyol generally refers to polymers which are substantially terminated at each end with —OH, —SH, and/or —NHR' groups (encompassing C—OH, P—OH, —C(O)OH, etc. moieties). R' may be H, or optionally substituted alkyl, heteroalkyl, aryl, heteroaryl, cycloalkyl or heterocycloalkyl, optionally R' is H or optionally substituted alkyl.

By way of example, at least about 90%, at least about 95%, at least about 98% or at least about 99% of polymers may be terminated at each end with —OH groups. The skilled person will appreciate that if the polymer is linear, then it may be capped at both ends with —OH groups. If the polymer is branched, each of the branches may be capped with —OH groups. Such polymers are generally useful in preparing higher polymers such as polyurethanes. The chains may comprise a mixture of functional groups (e.g. —OH and —SH) groups, or may contain the same functional group (e.g. all-OH groups).

The term "continuous" used herein can be defined as the mode of addition of materials or may refer to the nature of the reaction method as a whole.

In terms of continuous mode of addition, the relevant materials are continually or constantly added during the course of a reaction. This may be achieved by, for example, adding a stream of material with either a constant flow rate or with a variable flow rate. In other words, the one or more materials are added in an essentially non-stop fashion. It is noted, however, that non-stop addition of the materials may need to be briefly interrupted for practical considerations, for example to refill or replace a container of the materials from which these materials are being added.

In terms of a whole reaction being continuous, the reaction may be conducted over a long period of time, such as a number of days, weeks, months, etc. In such a continuous reaction, reaction materials may be continually topped-up and/or products of the reaction may be tapped-off. It will be appreciated that although catalysts may not be consumed during a reaction, catalysts may in any case require topping-up, since tapping-off may deplete the amount of catalyst present.

A continuous reaction may employ continuous addition of materials.

A continuous reaction may employ a discontinuous (i.e. batch-wise or semi batch-wise) addition of materials The term series used herein refers to when two or more reactors are connected so that the crude reaction mixture can flow from the first reactor to the second reactor.

The term nested used herein refers to when two or more reactors are configured so that one is located within the other. For example in the present invention, when the second reactor is located inside the first reactor, allowing the conditions of both reactors to influence the other.

EXAMPLES

Example 1

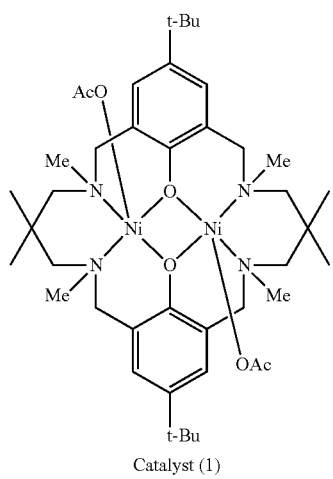

Catalyst (1)

Hexanediol (2.6 g) was added into a 100 mL reactor and a mixture of catalyst (1) (0.15 g) in PO (12.45 g) injected into the vessel. The vessel was heated to 75° C. and pressurised to 20 bar and stirred for 16 hours after which it was cooled and vented, resulting in a ca. 550 g/mol PPC-polyol. The contents of the reactor were then transferred to a clean, dry Schlenk along with PO (2 mL) and EtOAc (6 mL).

In a separate 100 mL reactor, 9.2 mg of DMC catalyst as made in WO2017/037441, example 1 and hexanediol (0.26 g) were dried at 120° C. under vacuum for 1 hour. Ethyl acetate (12 mL) was injected into the vessel via a syringe under continuous flow of $CO_2$ gas. The vessel was heated to the desired temperature (130° C.). 3.75 g of propylene oxide was added in 3 bursts 1.25 g each with 30 minutes between each to confirm activity of the DMC catalyst.

The reactor was cooled to 85° C. whilst pressurising to 4.5 bar with $CO_2$ and PO (1.25 g) was added. The Schlenk mixture from above was then added via a HPLC pump. added over 1 hour. The reaction continued for 5 hours. The reactor was cooled to below 10° C. and the pressure was released. NMR and GPC were measured immediately.

Example 2

PPG400 (7.26 g) was taken into a 100 mL reactor and dried at 120° C. under vacuum for 1 hour. A mixture of catalyst (1) (0.12 g) in PO (12.45 g) injected into the vessel. The vessel was heated to 75° C. and pressurised to 10 bar and stirred for 16 hours after which it was cooled and vented, resulting in a ca. 1000 g/mol PPC-polyol. The contents of the reactor were then transferred to a clean, dry Schlenk along with PO (3 mL) and EtOAc (9 mL) and kept under $N_2$.

In a separate 100 mL reactor, 9.2 mg of DMC catalyst as per WO2017/037441 example 1 and PPG400 (0.88 g) were dried at 120° C. under vacuum for 1 hour. The reactor was cooled down to room temperature and ethyl acetate (12 mL) was injected into the vessel via a syringe under continuous flow of $CO_2$ gas. The vessel was heated to the desired temperature (130° C.). 3.75 g of propylene oxide was added in 3 bursts (1.25 g each) with 30 minutes between each to confirm activity of the DMC catalyst.

The reactor was cooled to 85° C. whilst pressurising to 4.5 bar with $CO_2$ and PO (1.25 g) was added. The Schlenk mixture from above was then added via a HPLC pump. added over 1 hour. The reaction was carried out over 5 hours. The reactor was cooled to below 10° C. and the pressure was released. NMR and GPC were measured immediately.

Example 3

Hexanediol (93.9 g) was taken into a 2 L reactor and dried at 120° C. under vacuum for 1 hour. The reactor was cooled and catalyst (1) (4.38 g) and PO (544 g) were added to the vessel. The vessel was heated to 75° C. and pressurised to 20 bar and stirred for 16 hours after which anhydrous EtOAc (225 g) was added and the mixture cooled and vented, resulting in a ca. 550 g/mol PPC-polyol. The contents of the reactor were stored under nitrogen until used in reaction 2.

In a separate 2 L reactor, DMC catalyst as per WO2017/037441 example 1 (50 mg) and PPG400 (0.4 mL) were dried at 120° C. under vacuum for 1 hour. The vacuum was broken with $CO_2$ (0.2 barg), ethyl acetate (250 g) added via HPLC pump and the mixture heated to the desired temperature (130° C.). 17 g of propylene oxide was added in 3 bursts (10 g, 5 g, 2 g) each time observing the rise and fall of pressure indicating DMC activation.

The reactor was cooled to 85° C. and pressurising to 4.5 bar with $CO_2$. An additional 15 g PO was added. The reaction 1 mixture was then added via a HPLC pump over 2 hours after which additional PO (10 g) was added. The reaction was completed overnight. The reactor was cooled to below 10° C. and the pressure was released. NMR and GPC were measured immediately.

Example 4

Example 4 was carried out as per example 3, except hexanediol (48.7 g) and catalyst (1) (3.16 g) were used to make a ca. 1100 g/mol PPC-polyol.

Example 5

Example 5 was carried out as per example 4 except hexanediol (39.8 g) was used to make a ca. 1300 g/mol PPC polyol.

Example 6

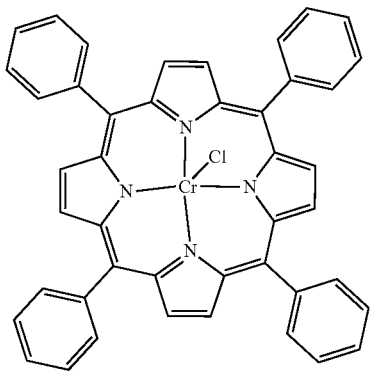

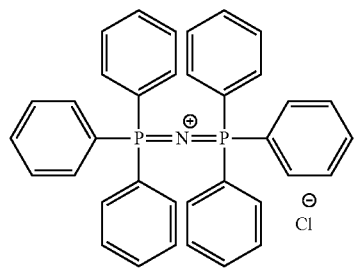

Above: catalyst (2) and co-catalyst PPNCl

Hexanediol (1.4475 g) was added into a 100 mL reactor and a mixture of catalyst (2) (28.6 mg) and co-catalyst PPNCl (bis(triphenylphosphine) iminiumchloride, 23.4 mg) in EtOAc (10 mL) injected into the vessel followed by PO (20 mL). The vessel was heated to 70° C. and pressurised to 15 bar and stirred for 16 hours after which it was cooled and vented, resulting in a ca. 1200 g/mol polyol with approximately 85% carbonate linkages. The contents of the reactor were then transferred to a clean, dry Schlenk along with PO (6 mL).

In a separate 100 mL reactor, 9.2 mg of DMC catalyst as per WO2017/037441 example 1 and PPG 400 (0.49 mL) were dried at 120° C. under vacuum for 1 hour. Ethyl acetate (15 mL) was injected into the vessel via a syringe. The vessel was heated to the desired temperature (130° C.). 0.9 g of propylene oxide was added in 2 bursts 0.45 g each with 30 minutes between each to confirm activity of the DMC catalyst.

The reactor was cooled to 85° C. whilst pressurising to 4.5 bar with $CO_2$ and PO (2 g) was added. The Schlenk mixture from above was then added via a HPLC pump. over 1 hour. Extra EtOAc was added (5 mL). The reaction continued for 16 hours. The reactor was cooled to below 10° C. and the pressure was released. NMR and GPC were measured immediately.

TABLE 1

Results from Example 1-6

| Example | Conversion % | Overall $CO_2$ wt % | Mn g/mol | PDI |
|---|---|---|---|---|
| 1 | 100 | 17.6 | 750 | 1.10 |
| 2 | 100 | 17.3 | 1600 | 1.10 |
| 3 | 100 | 19.5 | 760 | 1.11 |
| 4 | 100 | 21.1 | 2060 | 1.60 |
| 5 | 100 | 24.5 | 1830 | 1.30 |
| 6 | 100 | 18.5 | 1850 | 1.26 |

The overall $CO_2$ wt % was calculated according to the method set out in WO2017/037441.

The examples demonstrate that the low molecular weight polycarbonate polyols, which have poor stability, do not have to be stored or purified but can be produced and used in situ to produce more stable polyols with high overall $CO_2$ contents containing a mixture carbonate and ether linkages, under low $CO_2$ pressures. Furthermore, the process can produce polymers with $CO_2$ contents in the core of the polymer and higher ether contents at the end of the polyols.

Examples 7-11

Example 7-11 were carried out as per example 1, except they were carried out in a 2 L reactor. Reaction 1 was carried out using the quantities detailed in Table 2.

In a separate 2 L reactor reaction 2 was carried out using the quantities detailed in table 3. The reactor minimum fill requirements during DMC activation were met by addition of either ethyl acetate (280 mL) or polycarbonate ether polyol product from a preceding dual reactor reaction. DMC catalyst was activated using 15 g bursts of PO. The PPC/PO mixture from above was then added at 85° C. via a HPLC pump added over 1-3 hours. Following PPC addition, a further quantity of PO was then added to the mixture via HPLC at 5 mL/min. The reaction was "cooked out" for a further 1-16 hours before being cooled to below 10° C. and pressure released. NMR and GPC were measured immediately.

TABLE 2

Quantities and conditions used for reactor 1 in experiments 7-11
Reaction 1

| E.g. | PO/g | Catalyst (1)/g | Starter | Starter/g | EtOAc/g | Set Temp/C. | Set Pressure/barg |
|---|---|---|---|---|---|---|---|
| 7 | 544 | 3.16 | Hexanediol | 35.0 | 400 | 75 | 18 |
| 8 | 544 | 2.48 | DPG | 47.0 | 0 | 75 | 20 |
| 9 | 544 | 2.20 | Hexanediol | 43.5 | 0 | 65 | 7.7 |
| 10 | 544 | 3.16 | Hexanediol | 40.0 | 150 | 65 | 8 |
| 11 | 544 | 2.8 | Hexanediol | 44 | 150 | 74 | 20 |

TABLE 3

Quantities and conditions used for reactor 2 in experiments 7-11
Reaction 2

| E.g | Starter | Starter/g | DMC/g | Min. fill | PO/g | Cookout time (h) | Final CO2 wt % | PCE Mn | PCE PDI |
|---|---|---|---|---|---|---|---|---|---|
| 7 | Hex | 2.2 | 0.3 | EtOAc | 40 | 2 | 26% | 2650 | 1.14 |
| 8 | DPG | 2.5 | 0.073 | EtOAc | 95 | 16 | 20% | 2000 | 1.40 |
| 9 | Hex | 2.2 | 0.15 | EtOAc | 80 | 1 | 17% | 2050 | 1.17 |
| 10 | Hex | 2.2 | 0.1 | EtOAc | 60 | 16 | 21% | 2000 | 1.19 |
| 11 | N/A | N/A | 0.15 | PCE polyol | 45 | 2.5 | 23% | 1900 | 1.14 |

The examples demonstrate that the low molecular weight polycarbonate polyols, which have poor stability, do not have to be stored or purified but can be produced and used in situ to produce more stable polyols with high overall $CO_2$ contents containing a mixture carbonate and ether linkages, under low $CO_2$ pressures (see examples 9 and 10). Furthermore, the process can produce polymers with $CO_2$ contents in the core of the polymer and higher ether contents at the end of the polyols.

Example 11 demonstrates the process tolerates using the final polyol product as the 'starter' to activate the DMC catalyst in reactor 2. This method demonstrates that the reaction 'heel' of a previous reaction can be left in the reactor to activate the DMC for the next reaction and satisfy the minimum fill of the reactor. This is particularly useful in manufacturing to eliminate the need for solvent or a different starter to pre-activate the DMC with.

The thermal stability of a PPC polyol as produced in reaction 1 (Mn 2000) was compared against a polyol of the invention produced by example 10 (FIG. 1). It can be clearly seen that the block copolymer polyol produced by the dual reaction has enhanced thermal stability compared to the PPC polyol.

The invention claimed is:

1. A polyol block copolymer comprising a polycarbonate block, A, (A'-Z'—Z—(Z'-A') n-), and polyethercarbonate blocks, B, wherein the polyol block copolymer has the polyblock structure:

B-A'-Z'—Z—(Z'-A'-B)n wherein n=t–1 and wherein t=the number of terminal OH group residues on the block A;
wherein each A' is independently a polycarbonate chain having at least 70% carbonate linkages, and wherein each B is independently a polyethercarbonate chain having 50-99% ether linkages and at least 1% carbonate linkages;
wherein Z'—Z—(Z') n is a starter residue; wherein Z is selected from optionally substituted alkylene, alkenylene, alkynylene, heteroalkylene, heteroalkenylene, heteroalkynylene, cycloalkylene, cycloalkenylene, heterocycloalkylene, heterocycloalkenylene, arylene, heteroarylene, an alkylarylene, heteroalkylarylene, heteroalkylheteroarylene or alkylheteroarylene group, or Z may be a combination of any of these groups;
wherein Z' is selected from —O—, —NR'—, —S—, —C(O)O—, —P(O) (OR')O—, —PR' (O) (O—)₂ or —PR' (O)O—;
wherein R' is selected from H, or optionally substituted alkyl, heteroalkyl, aryl, heteroaryl, cycloalkyl or heterocycloalkyl; and
wherein the polycarbonate block A is prepared using an epoxide.

2. The polyol block copolymer according to claim 1, wherein the starter residue depends on the nature of the starter compound, and wherein the starter compound has the formula (III):

Z(RZ)a (III)

wherein Z can be any group which can have 1 or more —RZ groups attached to it and may be selected from optionally substituted alkylene, alkenylene, alkynylene, heteroalkylene, heteroalkenylene, heteroalkynylene, cycloalkylene, cycloalkenylene, hererocycloalkylene, heterocycloalkenylene, arylene, heteroarylene, or Z may be a combination of any of these groups;
a is an integer which is at least 1;
wherein each RZ may be —OH, —NHR', —SH, —C(O) OH, —P(O) (OR') (OH), —PR' (O) (OH)2 or —PR' (O) OH, optionally RZ is selected from —OH, —NHR' or —C(O) OH, optionally each RZ is —OH, —C(O) OH or a combination thereof;
wherein R' may be H, or optionally substituted alkyl, heteroalkyl, aryl, heteroaryl, cycloalkyl or heterocycloalkyl, optionally R' is H or optionally substituted alkyl; and wherein Z' corresponds to RZ, except that a bond replaces the labile hydrogen atom.

3. A polyol block copolymer according to claim 1, wherein -A'- has the following structure:

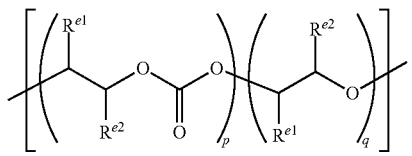

wherein the ratio of p:q is at least 7:3;
and block B has the following structure:

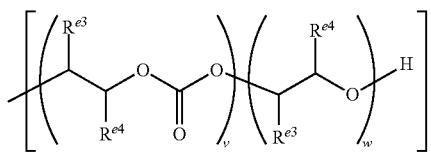

wherein the ratio of w:v is greater or equal to 1:1; and $R_{e1}$, $R^{e2}$, $R^{e3}$ and $R^{e4}$ depend on the nature of the epoxide used to prepare blocks A and B.

4. The polyol block copolymer according to claim 2, wherein a is an integer which is at least 2.

5. The polyol block copolymer according to claim 1, wherein the starter compound is selected from monofunctional starter substances; optionally alcohols, phenols, amines, thiols and carboxylic acid; and/or selected from diols, triols tetraols, polyols, or compounds having mixed functional groups.

6. The polyol block copolymer according to claim 1, wherein the polyol molecular weight (Mn) is in the range 300-20,000 Da and the molecular weight (Mn) of block A is in the range 200-4000 Da, and wherein the molecular weight (Mn) of block B is in the range 100-20,000 Da.

7. The polyol block copolymer according to claim 1, wherein block A has between 75% and 99% carbonate linkages.

8. A polyol block copolymer according to claim 1, wherein block A further comprises ether linkages.

9. The polyol block copolymer according to claim 1, wherein block A has between 1% and 25% ether linkages.

10. The polyol block copolymer according to claim 8, wherein the polyol block copolymer is prepared using an epoxide, and
wherein the epoxide is asymmetric and the polycarbonate has between 40-100% head to tail linkages.

11. The polyol block copolymer according to claim 8, wherein the polyol block copolymer is prepared using an epoxide, and
wherein between 0.1 and 20% of the total epoxide in block A is an epoxide containing more than one epoxide moiety.

12. The polyol block copolymer according to claim 1, wherein block A is a generally alternating polycarbonate polyol residue.

13. The polyol block copolymer according to claim 1, wherein the mol/mol ratio of block A to block B is in the range 25:1 to 1:250.

14. The polyol block copolymer according to claim 1, wherein the polyol block copolymer is prepared using an epoxide, and
wherein at least 30% of epoxide residues of block A are ethylene oxide or propylene oxide residues.

15. The polyol block copolymer according to claim 1, wherein the polyol block copolymer is prepared using an epoxide, and
wherein at least 30% of epoxide residues of block B are ethylene oxide or propylene oxide residues.

16. A composition comprising the polyol block copolymer of claim 1 and one or more additives selected from catalysts, blowing agents, stabilizers, plasticisers, fillers, flame retardants, and antioxidants.

17. The composition according to claim 16, further comprising a (poly) isocyanate.

18. A polyurethane produced from the reaction of a polyol block copolymer according to claim 1.

19. The polyurethane according to claim 18, wherein the polyurethane is in the form of a soft foam, a flexible foam, an integral skin foam, a high resilience foam, a viscoelastic or memory foam, a semi-rigid foam, a rigid foam, an elastomer, an adhesive, a sealant or a coating.

20. An isocyanate terminated polyurethane prepolymer comprising the composition according to claim 16 with an excess of (poly) isocyanate.

21. A lubricant composition comprising a polyol block copolymer of claim 1.

22. A surfactant composition comprising a polyol block copolymer of claim 1.

* * * * *

UNITED STATES PATENT AND TRADEMARK OFFICE
CERTIFICATE OF CORRECTION

PATENT NO. : 12,351,681 B2
APPLICATION NO. : 17/608249
DATED : July 8, 2025
INVENTOR(S) : James Leeland et al.

Page 1 of 1

It is certified that error appears in the above-identified patent and that said Letters Patent is hereby corrected as shown below:

In the Claims

Claim 3, Column 37, Line 27, should read --$R^{e1}$, $R^{e2}$, $R^{e3}$ and $R^{e4}$ depend on the nature of the epoxide--

Claim 5, Column 37, Line 36, should read --triols, tetraols, polyols, or compounds having mixed func- --

Signed and Sealed this
Ninth Day of December, 2025

John A. Squires
*Director of the United States Patent and Trademark Office*